(12) United States Patent
Shimazu

(10) Patent No.: US 6,577,927 B2
(45) Date of Patent: Jun. 10, 2003

(54) INFORMATION FURNISHING APPARATUS FOR COPING WITH EMERGENCY DURING CAR DRIVING

(75) Inventor: Hideo Shimazu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/783,269

(22) Filed: Feb. 12, 2001

(65) Prior Publication Data

US 2001/0014841 A1 Aug. 16, 2001

(30) Foreign Application Priority Data

Feb. 16, 2000 (JP) ........................................ 2000-043553

(51) Int. Cl.⁷ ............................................. G10C 21/20
(52) U.S. Cl. ............................ 701/1; 701/1; 73/178 R; 340/425.5; 340/901; 340/988
(58) Field of Search ...................... 701/1, 200; 340/901, 340/902, 903, 904, 988, 989, 425.5, 500

(56) References Cited

U.S. PATENT DOCUMENTS

| 5,948,040 | A | * | 9/1999 | DeLorme et al. | ............ 701/201 |
| 5,987,381 | A | * | 11/1999 | Oshizawa | .................... 701/209 |
| 6,202,024 | B1 | * | 3/2001 | Yokoyama et al. | ......... 701/207 |
| 6,263,276 | B1 | * | 7/2001 | Yokoyama et al. | ......... 701/207 |
| 6,272,488 | B1 | * | 8/2001 | Chang et al. | ................... 707/4 |

FOREIGN PATENT DOCUMENTS

| EP | 0 737 952 A1 | 10/1996 |
| EP | 0 756 153 A2 | 1/1997 |
| JP | H6-331379 | 12/1994 |
| JP | 10-44894 | 2/1998 |
| JP | H10-162284 | 6/1998 |
| JP | H11-70744 | 3/1999 |
| JP | 2000-32159 | 1/2000 |
| WO | WO 99/28145 | 6/1999 |
| WO | WO 01/08120 A1 | 2/2001 |

\* cited by examiner

Primary Examiner—William A. Cuchlinski, Jr.
Assistant Examiner—Olga Hernandez
(74) Attorney, Agent, or Firm—Scully, Scott, Murphy & Presser

(57) ABSTRACT

Providing a vehicle driver information useful in overcoming an emergency situation overheating etc. On receipt of a control signal 112 indicating emergency, emergency situation decision unit 109 of vehicle side equipment 104 decides the type name of the service useful for overcoming the emergency. Information acquisition unit 111 routes an information inquiry request, specifying the type name, the current position of an own vehicle detected by a position detection device 107 and the current time detected by the time detection device 108, through communication device 103 to common equipment 101 of operation center. Information retrieval unit 106 of the common equipment 101 retrieves optimum service purveyor information from the service in storage unit 105, taking into account the type name, current vehicle position and the current time, as specified by the request, and returns the retrieved service purveyor information, which is supplied to the driver.

30 Claims, 13 Drawing Sheets

FIG. 9

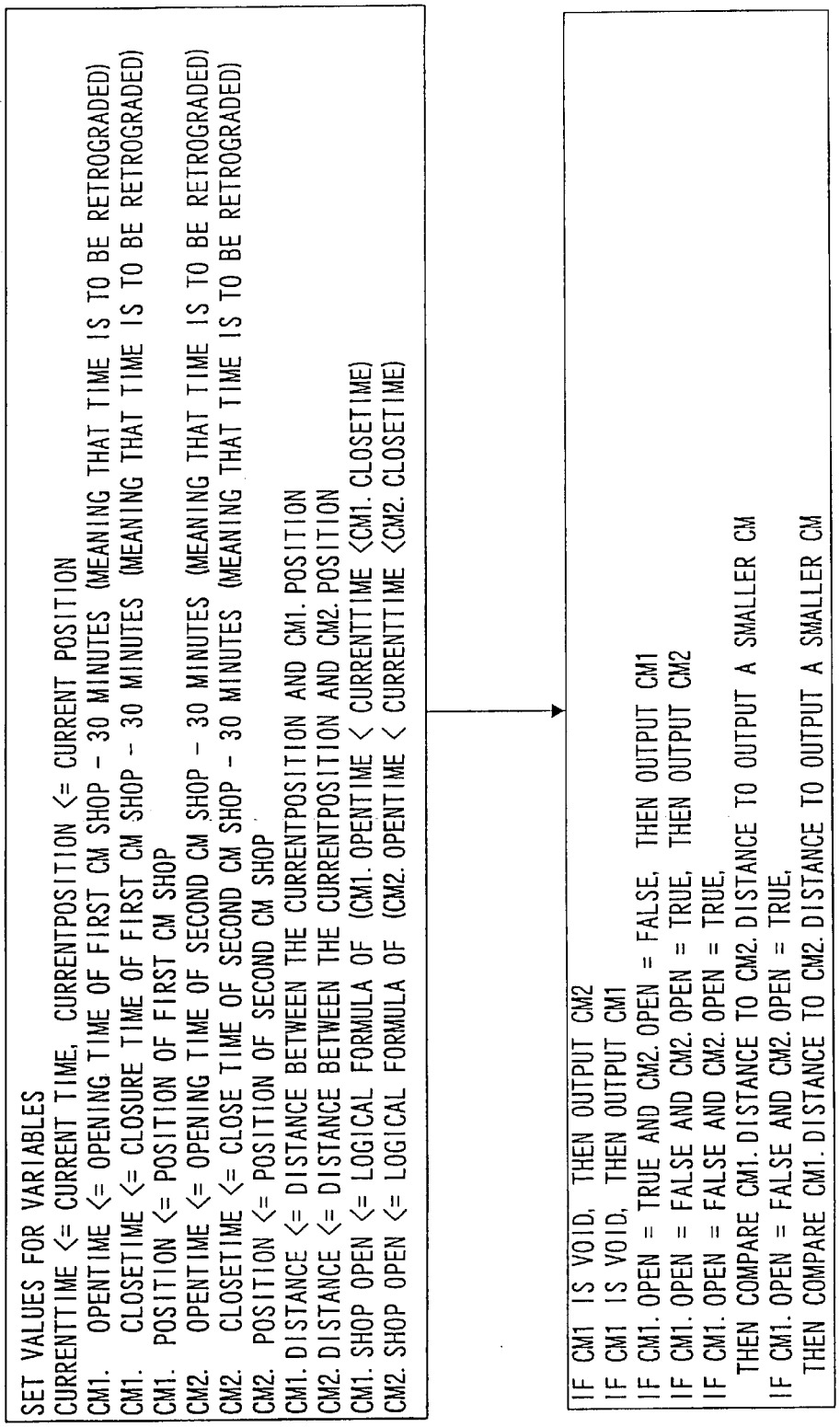

```
SET VALUES FOR VARIABLES
CURRENTTIME <= CURRENT TIME, CURRENTPOSITION <= CURRENT POSITION
CM1. OPENTIME <= OPENING TIME OF FIRST CM SHOP - 30 MINUTES (MEANING THAT TIME IS TO BE RETROGRADED)
CM1. CLOSETIME <= CLOSURE TIME OF FIRST CM SHOP - 30 MINUTES (MEANING THAT TIME IS TO BE RETROGRADED)
CM1. POSITION <= POSITION OF FIRST CM SHOP
CM2. OPENTIME <= OPENING TIME OF SECOND CM SHOP - 30 MINUTES (MEANING THAT TIME IS TO BE RETROGRADED)
CM2. CLOSETIME <= CLOSE TIME OF SECOND CM SHOP - 30 MINUTES (MEANING THAT TIME IS TO BE RETROGRADED)
CM2. POSITION <= POSITION OF SECOND CM SHOP
CM1. DISTANCE <= DISTANCE BETWEEN THE CURRENTPOSITION AND CM1. POSITION
CM2. DISTANCE <= DISTANCE BETWEEN THE CURRENTPOSITION AND CM2. POSITION
CM1. SHOP OPEN <= LOGICAL FORMULA OF (CM1. OPENTIME < CURRENTTIME <CM1. CLOSETIME)
CM2. SHOP OPEN <= LOGICAL FORMULA OF (CM2. OPENTIME < CURRENTTIME <CM2. CLOSETIME)
```

```
IF CM1 IS VOID, THEN OUTPUT CM2
IF CM1 IS VOID, THEN OUTPUT CM1
IF CM1. OPEN = TRUE AND CM2. OPEN = FALSE, THEN OUTPUT CM1
IF CM1. OPEN = FALSE AND CM2. OPEN = TRUE, THEN OUTPUT CM2
IF CM1. OPEN = FALSE AND CM2. OPEN = TRUE,
    THEN COMPARE CM1. DISTANCE TO CM2. DISTANCE TO OUTPUT A SMALLER CM
IF CM1. OPEN = FALSE AND CM2. OPEN = TRUE,
    THEN COMPARE CM1. DISTANCE TO CM2. DISTANCE TO OUTPUT A SMALLER CM
```

INFORMATION FURNISHING APPARATUS FOR COPING WITH EMERGENCY DURING CAR DRIVING

FIELD OF THE INVENTION

This invention relates to an apparatus which, on occurrence of an event due to an emergency during travel in a car, automatically retrieves the useful information useful for eliminating the event to present the information to a driver.

BACKGROUND OF THE INVENTION

Nowadays, there is established, as a commercial service, a service of installing an information furnishing apparatus, constructed e.g., as a computer terminal, in a car to furnish a variety of information to a driver.

First, there is a service employing a broadcast infrastructure. For example, VICS and teletext of FM Tokyo are furnishing the traffic information to car drivers. The services exploiting the broadcast infrastructure airs the same broadcast program in unison without regard to the circumstances of individual cars.

Second, there are numerous services exploiting the communication infrastructure, such as radio telephone. Examples of these services include Mone by Toyota and related its firms (abridged as "et al" hereinafter), Compass Link by Nissan et al., Inter-Navi by Honda Giken et al., ITGS by Mercedes Benz et al., and Mobile Link by many car navigation producing firms, and the like. In these services, exploiting the communication infrastructure, contents conforming to requests by individual drivers are sent to meet these requests. These may be classified as one sort of personal computer communication services for car drivers.

Third, there is known a system of automatically transmitting a communication notifying the occurrence of an accident and asking for rescue. Typical of such a system is the May-Day system which, on occurrence of an accident, automatically transmits a radio telephone call to ask a rescue center for rescue. An apparatus for coping with a car accident, as an analogous technique, is disclosed in JP Patent Kokai JP-A-10-44894. The OnStar, which the GM of USA offers as the commercial service, provides for communication between the car and the center by a portable telephone. Specifically, with this service, a control equipment of a car can be controlled from the center in case of occurrence of accidents or handle lock.

SUMMARY OF THE DISCLOSURE

There is much to be desired in the art, and particular problems have been encountered during the course of the investigations toward the present invention.

During car driving, there is a possibility that, in addition to crash accidents, a variety of problems, such as gas depletion, engine overheating, wear caused to the clutch and so forth. The commercial system of automatically transmitting a request for rescue in case a automotive vehicle has been disabled to be driven due to gas depletion or overheating is a function partially made into commercial service by the aforementioned OnStar. However, this service is predicted to be very costly.

As for the OnStar, GM loads it on certain high-grade automotive vehicles, such as Cadillac. Moreover, since OnStar is a toll service that costs tens of dollars per month regardless of whether or not the service is actually used. So, this service is not to be used freely by users at large. Of course, a driver would be willing to pay the high cost as a recompense for the service offered if the automotive vehicle he or she is driving is completely disabled to be driven. However, if the state of the automotive vehicle is no more than a pseudo-alarm state indicating a possible, not impending, trouble or a trouble likely to occur at most, no one would be willing to use the expensive automatic rescue service. There lacks up to now an inexpensive information service for an individual user under such pseudo-alarm state.

It is an object of the present invention to provide an apparatus for furnishing the information useful to overcome an emergency situation that has occurred in a travelling automotive vehicle, such as overheating.

First Aspect

The information purveying apparatus for coping with an emergency during driving a car, according to the first aspect of the present invention, accomplishes the above object using an communication infrastructure. The information purveying apparatus comprises:

a common equipment provided on an operation center and an automotive vehicle side equipment provided on an automotive vehicle one to another, in which the automotive vehicle side equipment is capable of performing bidirectional communication with the operating center (common equipment). The common equipment includes a service information storage unit storing a plurality of contents information comprehending at least the appellation of service purveyors, a plurality of type names indicating types of the services purveyed by the service purveyors, and a plurality of service purveyors information comprehending the business time and business places of the service purveyors. The information purveying apparatus further comprises an information retrieval unit retrieving, on reception from the automotive vehicle an information inquiry request at least specifying the type name indicating the type of the service useful in overcoming the emergency situation that has occurred in the automotive vehicle and the current position of the automotive vehicle, the optimum service purveyor information useful to overcome the emergency situation that has occurred, from the service information storage unit, taking into account the type name specified, current position and the current time, and for transmitting at least the contents information to the automotive vehicle as a requestor. The automotive vehicle side equipment includes a position detection unit detecting the current position of the automotive vehicle, an emergency situation decision unit determining, on occurrence of an emergency situation, the type name indicating the sort of the service useful in overcoming the emergency situation that has occurred, and an information acquisition unit transmitting an information inquiry request at least specifying the type name determined by the emergency situation decision unit and the current position of the automotive vehicle as detected by the position detection unit to the information retrieval unit of the operating center, and outputting the information transmitted as a response from the information retrieval unit at an output device.

The information retrieval unit sets, as an optimum service purveyor information, a service purveyor information, among the plurality of service purveyors information stored in the service information storage unit, which has the same type name as the type name specified by the information inquiry, such that the vehicle can be reached within the business time judging from the current time, and the place of business of which is closer to the current car position as a source of inquiry. The current time, as required for the processing in the information retrieval unit, may be acquired by the automotive vehicle side device or on the common equipment. In the former case, the automotive vehicle side equipment includes a time detection unit detecting the current time, and the information acquisition unit comprehends the current time as detected by the time detection unit in the information inquiry request. In the latter case, the common equipment includes a time detection unit detecting the current time, and the information retrieval unit acquires the current time of a time point of reception of the information inquiry request from the time detection unit.

The common equipment includes a time detection unit detecting the current time and the automotive vehicle side device includes an automotive vehicle control device generating a control signal for coping with an unusual occurrence in the automotive vehicle and a correlation table stating the correlation between the control signal generated by the automotive vehicle control device and the type name specifying the type of the service useful in overcoming the unusual occurrence, the emergency situation decision unit, on occurrence of the control signal from the automotive vehicle control device, acquiring the type name corresponding to the generated control signal from the correlation table.

At least a portion of the service purveyor information stored in the service information storage unit is the CM information aired by data broadcast.

Second Aspect

The information purveying apparatus for coping with an emergency during driving an automotive vehicle, according to the second aspect of the present invention; accomplishes the above object using a broadcasting infrastructure, and is not in need of a common equipment of the operating center required in the first aspect. Specifically, the information purveying apparatus for coping with an emergency during driving an automotive vehicle, according to the second aspect, is equipped on an automotive vehicle carrying a data broadcast equipment. The information purveying apparatus is comprised of:

(a) an extraction unit extracting, from the information received by the data broadcast receiver, the service purveyors information including at least contents information having at least names of the service purveyors, type names indicating the sort of the services furnished by the service purveyors, and information on the business time and the places of business of the service purveyors, (b) a service information storage unit storing a plurality of the service purveyors information, (c) a position detection unit for detecting the current position of an automotive vehicle, (d) a time detection unit detecting the current time, (e) an emergency situation decision unit deciding on occurrence of an emergency situation the type name indicating the type of the service useful in overcoming the emergency situation that has occurred, and (f) an information registration acquisition unit, being fed with the service purveyor information extracted by the extraction unit, the current position detected by the position detection unit, the current time detected by the time detection unit and the type name determined by the emergency situation decision unit, said information registration acquisition unit performing the processing of registering the service purveyor information in the service information storage unit and processing for retrieving from the service information storage unit an optimum service purveyor information helpful to overcome the emergency situation that has occurred to output at least the content information from an output device.

The information registration acquisition unit may be any one of "System 1" of registering the service purveyor information extracted by the extraction unit, without sorting, in the service information storage unit, and sorting an optimum one of the information at the time of the information acquisition, "System 2" of previously sorting and registering the service purveyor information having the same type name so that an optimum one of the service purveyor information will be registered, and "System 3" of sorting the service purveyor information having the same type name to a certain extent and sorting an optimum one of the information at the time of acquisition of the information.

The information registration acquisition unit includes registering unit registering the service purveyor information newly extracted by the extraction unit in the service information storage unit, and an information acquisition unit retrieving from the service information storage unit the optimum service purveyor information useful in overcoming the emergency situation that has occurred, based on the type name determined by the emergency situation decision unit, the current time as detected by the time detection unit and the current automotive vehicle position as detected by the position detection unit. The information acquisition unit sets the service purveyors information, among the service purveyors information stored in the service information storage unit, which has the same type name as the type name determined by the emergency situation decision unit, such that the service is accessible or available within the business time judging from the current time and the place of business of which is closer to the current position of the automotive vehicle, as the optimum service purveyor information.

In the case of System 2, the information registration acquisition unit includes registering means for operating the registration so that, if a number exceeding N of the service purveyors information having the same type name as that of the service purveyor information newly extracted by the extracting unit is stored in the service information storage unit, only more desirable upper N service purveyor information will be registered in the service information storage unit, based on the current time as detected by the time detection unit and on the current automotive vehicle position is detected by the position detection unit and information acquisition unit retrieving from the service information storage unit the optimum service purveyor information useful in overcoming the emergency situation that has occurred, based on the type name as determined by the emergency situation decision unit, the current time as detected by the time detection unit and on the current automotive vehicle position as detected by the position detection unit. The registering means sets the service purveyor information, such that the service is accessible or available within the business time judging from the current time and the place of business of which is closer to the current position of the automotive vehicle, as the more desirable service purveyor information.

In the case of System 3, the information registration acquisition unit includes registering means for operating the registration so that, if a number exceeding of the service purveyors information having the same type name as that of the service Purveyors information newly extracted by the extracting unit is stored in the service information storage unit, only more desirable upper N service Purveyors information will be registered in the service information storage unit, based on the current time as detected by the time detection unit and on the current automotive vehicle position as detected by the position detection unit, and information acquisition unit retrieving from the service information storage unit the optimum service purveyor information useful in overcoming the emergency situation that has occurred, based on the type name as determined by the emergency situation decision unit, the current time as detected by the time detect ion unit and on the current automotive vehicle position as detected by the position detection unit. The information acquisition unit sets the service purveyor information which has the same type name as the type name as determined by the emergency situation decision unit, such that the service is accessible or available within the business time judging from the current time, and the place of business of which is closer to the current position of the automotive vehicle, as the optimum service purveyor information. On the other hand, the registering means sets the service purveyor information, such that the service is accessible or available within the business time judging from the current time and the place of business of which is closest to the current position of the automotive vehicle, as the optimum service purveyor information, whilst the information acquisition unit sets the service purveyor information, among the plurality of service purveyors information stored in the service information storage unit, which has the same type name as the type name determined by the service information storage unit, such that the service is accessible or available within the business time and the place of business of which lies closer to the current position of the automotive vehicle, as the optimum service purveyor information.

In the second aspect of the present invention, there are provided an automotive vehicle control device for generating a control signal for coping with the unusual occurrence in the automotive vehicle and a correlation table stating the correlation between the control signal generated in the automotive vehicle control device and the type name specifying the sort of the service useful in overcoming the unusual occurrence. When the control signal is generated by the automotive vehicle control device, the emergency situation decision unit acquires the type name associated with the control signal from the correlation table. Since a control device for coping with the unusual occurrence, such as gas depletion, oil change, clutch wear or overheating, is usually built into the automotive vehicle, the automotive vehicle control device is able to exploit such pre-existing control devices.

The service purveyor information, extracted from the information received by the data broadcast receiver, may be the CM information as in the first aspect. However, the service purveyor information is not necessarily be limited to the CM information.

BRIEF DESCRIPTION OF THE DRAWINGS

FIG. 9 shows a typical rule used in an embodiment of the second aspect of the present invention.

PREFERRED EMBODIMENTS OF THE INVENTION

Figure 1:
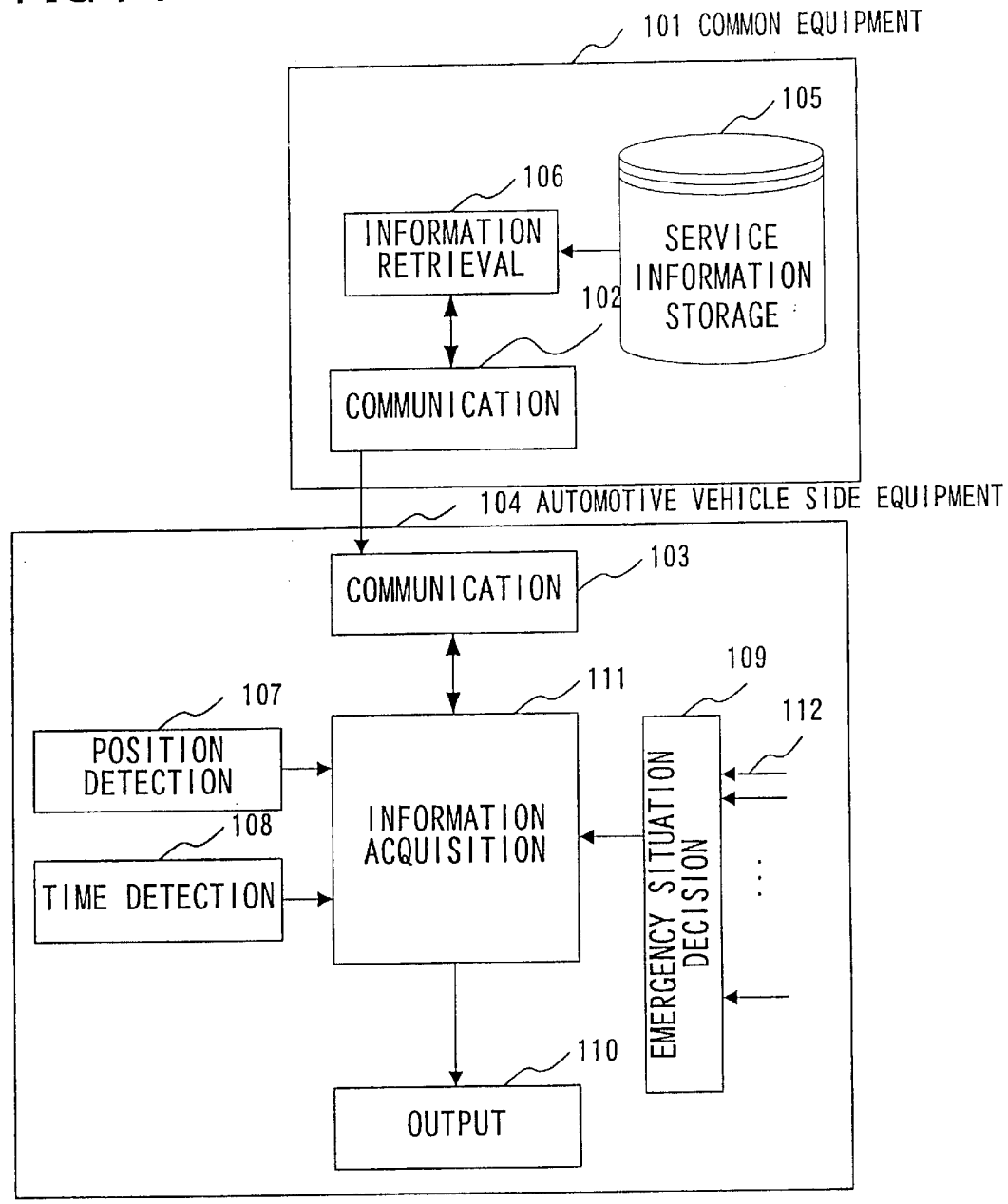
FIG. 1 is a block diagram of an embodiment of a first aspect of the present invention.

Referring to the drawings, preferred embodiment of the present invention will be explained in detail.

First, referring to FIG. 1, an embodiment according to the first aspect of the present invention is made up of a common equipment 101 provided on a center side and a equipment 104 provided on a side of automotive vehicle capable of bidirectional communication with the common equipment 101. The automotive vehicle side equipment 104 is provided from one automotive vehicle embodying the present invention to another.

The common equipment 101 includes a communication device (unit) 102 for having bidirectional communication with the automotive vehicle side equipment 104, a service information storage unit 105, and an information retrieval unit 106. In the service information storage unit 105, there are pre-stored a plurality of service purveyors information. Each service purveyor information is, for example, the CM (commercial) information broadcast by e.g., data broadcast, and is made up of the content information comprehending at least the appellation of service purveyors, type names indicating the types of the services furnished by the service purveyors, the business time and the place (station) of business of the service purveyors. Other attributes pertinent to the service purveyors, such as relation of parent and subsidiary firms or payable credit cards, may also be included in the information on the service purveyors. The content information may also contain telephone numbers of service purveyors, guides to the place of business and types of business. The information retrieval unit 106 has the function of retrieving the service purveyor information optimum for the information inquiry request sent from the automotive vehicle side equipment 104 from the service information storage unit 105 to return the service purveyor information retrieved to the source of request by communication.

On the other hand, the automotive vehicle side equipment 104 has a communication device 103, such as a portable telephone, for having bidirectional communication with the common equipment 101, a position detection device (unit) 107 for detecting the current automotive vehicle position, a time detection device 108 for detecting the current time, an emergency situation decision unit 109 for deciding the type name specifying the type of the service useful in eliminating the emergency situation that has occurred, an output device (unit) 110, and an information acquisition unit 111 for acquiring from the common equipment 101 the service purveyors information useful in eliminating the emergency situation that has occurred to output the acquired information to an output device 110.

The present embodiment, described above, operates as follows: If an automotive vehicle control device, not shown, issues a control signal 112 indicating an unusual state of an automotive vehicle, the emergency situation decision unit 109 of the automotive vehicle side equipment 104 decides the type name indicating the type of the service useful in eliminating the unusual situation, and outputs the type name so determined to the information acquisition unit 111. The information acquisition unit then formulates an information inquiry request specifying the type name received from the emergency situation decision unit 109, current position of the own automotive vehicle as detected by the position detection device 107 and the current position detected by a time detection device 108, and transmits the so-formulated information inquiry request by radio communication to the common equipment 101 of the center using the communication device 103.

On receipt of the information inquiry request, transmitted from the automotive vehicle side equipment 104 through the communication device 102, the information retrieval unit 106 of the common equipment 101 retrieves, from (or in) the information storage unit 105, an optimum service purveyor information which provides a service useful for eliminating the emergency situation that has occurred in the automotive vehicle in view of the type name specified by the request, current automotive vehicle position and the current time, and transmits at least the resultant contents information through the communication device 102. It is noted that the information retrieval unit 106 selects, as the optimum service purveyor information, the service purveyor information, among the service purveyors information stored in the service information storage unit 105, which has the type name as that specified by the information inquiry, which can be delivered within the business time judging from the current time and the place of business of which is closer to the current position of the automotive vehicle of the source of the inquiry.

The above information, transmitted from the information retrieval unit 106, is transmitted through the communication device 103 in the automotive vehicle side equipment 104 to the information acquisition unit 111, which then outputs the information via output device 110 to the automotive vehicle driver.

Thus, in the present embodiment; the information pertinent to an optimum service purveyor, from whom can be received the service useful for overcoming the emergency situation that has occurred, is automatically advised to the driver.

Although the time detection device 108 is provided in FIG. I to the automotive vehicle side equipment 104, it is also possible to provide the time detection device 108 on the common equipment 101 and to acquire the current time of the time point of receipt of the information inquiry request by the information retrieval unit 106 from the time detection device 108 for utilization.

Figure 2:
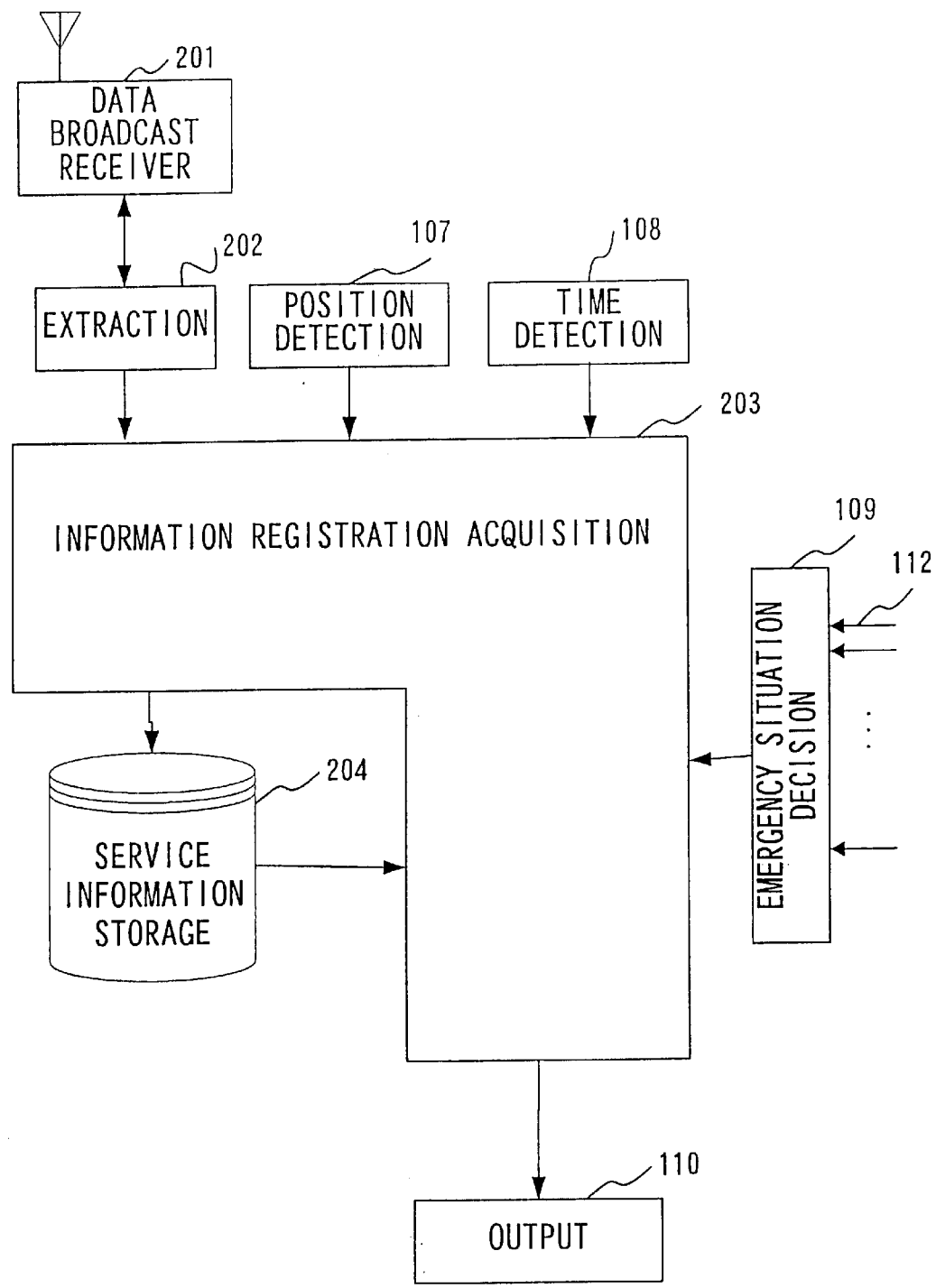
FIG. 2 is a block diagram of an embodiment of a second aspect of the present invention.

Referring to FIG. 2, an embodiment according to the second aspect of the present invention is now explained with reference to FIG. 2. The embodiment according to the second aspect of the present invention is an information purveying apparatus equipped on the automotive vehicle loaded with a data broadcast receiver 201, and includes, in addition to the position detection device 107, time detection device 108, emergency situation decision unit 109 and the output device 110, similar to those shown in FIG. 1, an extraction unit 202, an information registration acquisition unit 203 and a service information storage unit 204.

The extraction unit 202 has the function of extracting the service purveyor information from the information received by the data broadcast receiver 201. Each service purveyor information is e.g., the CM information aired by data broadcast, and comprehends at least the contents information including the appellation of the service purveyors, type names indicating the type of the service furnished by the service purveyors, the business time and the place of business of the service purveyors. Other attributes pertinent to the service purveyors, such as relation of parent and subsidiary firms or payable credit cards, may also be included in the information on the service purveyors. The contents information may also contain telephone numbers of service purveyors, guides to the place (station) of business and types of business.

The service information storage unit 204 is a storage unit for storing plural service purveyor information extracted by the extraction unit 202.

The information registration acquisition unit 203 performs the processing of registering the service purveyor information, extracted by the extraction unit 202, in the service information storage unit 204, and the processing of retrieving from the service information storage unit 204 the optimum service purveyor information which enables the service useful to eliminate the emergency situation that has occurred in the own automotive vehicle to output the retrieved information at the output device 110.

The present embodiment is classified in the following three types, depending on the difference in the structure of the information registration acquisition unit 203:

Type 1 System

The type 1 system is such a system in which the service purveyor information extracted by the extraction unit 202 is registered in the service information storage unit 204 without sorting, with an optimum information being then selected at the time of acquiring the information.

Type 2 System

This type 2 system is such a system in which the service purveyors information having the same type name, in the service purveyor information as extracted in the extraction unit 202, are pre-sorted so that an optimum sole service purveyor information will be registered in the service information storage unit 204, to permit the sorting at the time of the information acquisition to be omitted.

Type 3 system

This type 3 system is such a system in which the information registration acquisition unit 203 sorts the service purveyors information, extracted in the extraction unit 202, to a certain extent, to register the sorted information in the service information storage unit 204 to sort out the optimum information at the time of the information acquisition.

In the following, typical structures and operations of the respective systems are explained.

Figure 3:
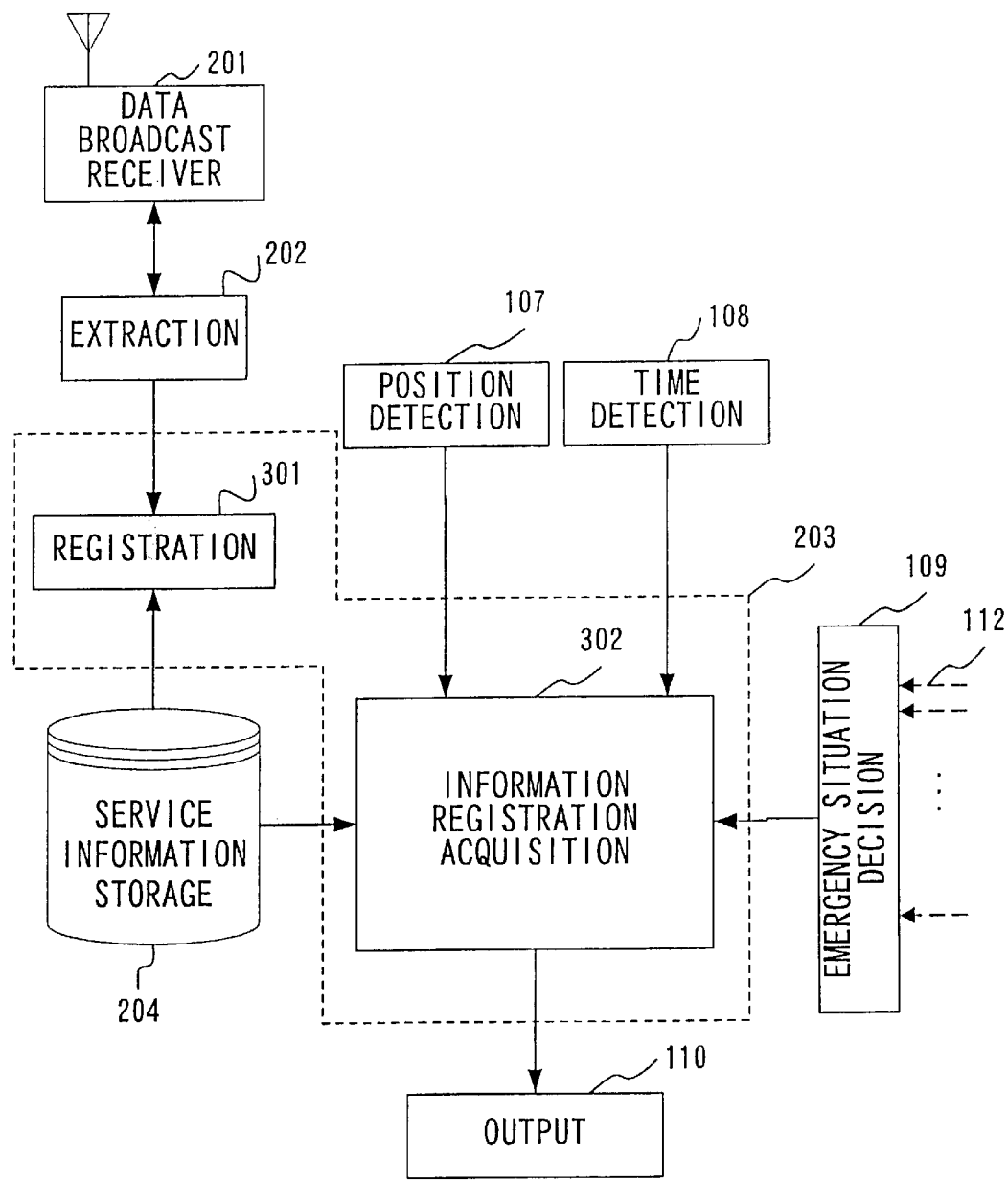
FIG. 3 is a block diagram of an embodiment of a system 1 of a second aspect of the present invention.

Referring to FIG. 3, an information registration acquisition unit 203 according to an embodiment of the second aspect of the invention pertinent to the type 1 system is made up of a registration unit 301 for registering the service purveyor information, newly extracted by an extraction unit 202, in a service information storage unit 204, and an information acquisition unit 302 for retrieving the optimum service purveyor information which enables reception of a service useful to overcome the emergency occurrence from the service information storage unit 204 to output the retrieved information.

The data broadcast receiver 201 is enabled to receive a preset broadcast channel, such as during the time an ignition switch of a automotive vehicle is turned on, to output the received information at all times to the extraction unit 202. If the service purveyor information is presented in the received information, the extraction unit 202 extracts the service purveyor information to output it to the registration unit 301. The registration unit the stores the extracted service purveyor information in the service information storage unit 204. The storage area of the service information storage unit 204 is classified into type names to store the extracted service purveyors information in a storage area corresponding to the type name. If there is no vacant portion in the storage area, the oldest service purveyor information, for example, is erased to create a vacant area for storage of the extracted service purveyor information therein.

In this manner, the service purveyor information, aired by data broadcast, is automatically sequentially stored in the service information storage unit 204.

On the other hand, if a control signal 112 corresponding to an unusual event of a automotive vehicle is issued from an automotive vehicle control device, not shown, the emergency situation decision unit 109 decides the type name corresponding to the unusual event of the automotive vehicle to output the so-determined type name to the information acquisition unit 302. The information acquisition unit 302 retrieves from the service information storage unit 204 the optimum service purveyor (or purveyors) information which enables the service useful in overcoming the emergency occurrence, based on the type name and on the current position of the own automotive vehicle as detected by the position detection device 107, and outputs at least the contents information from the output device 110 to a automotive vehicle driver. The information acquisition unit 302 selects, as the optimum service purveyor(s) information, the service purveyor(s) information, among the service purveyors information stored in the service information storage unit 204, which has the same type name as the type name determined by the emergency situation decision unit 109, such that the service purveyor(s) can reach the user (vehicle) within the business time judging from the current time, and the place of business of which is closer to the current position of the automotive vehicle. This enables the automotive vehicle driver to acquire the information pertinent to the service purveyor from whom the he or she is able to receive the service useful to overcome the emergency situation that has occurred.

Figure 4:
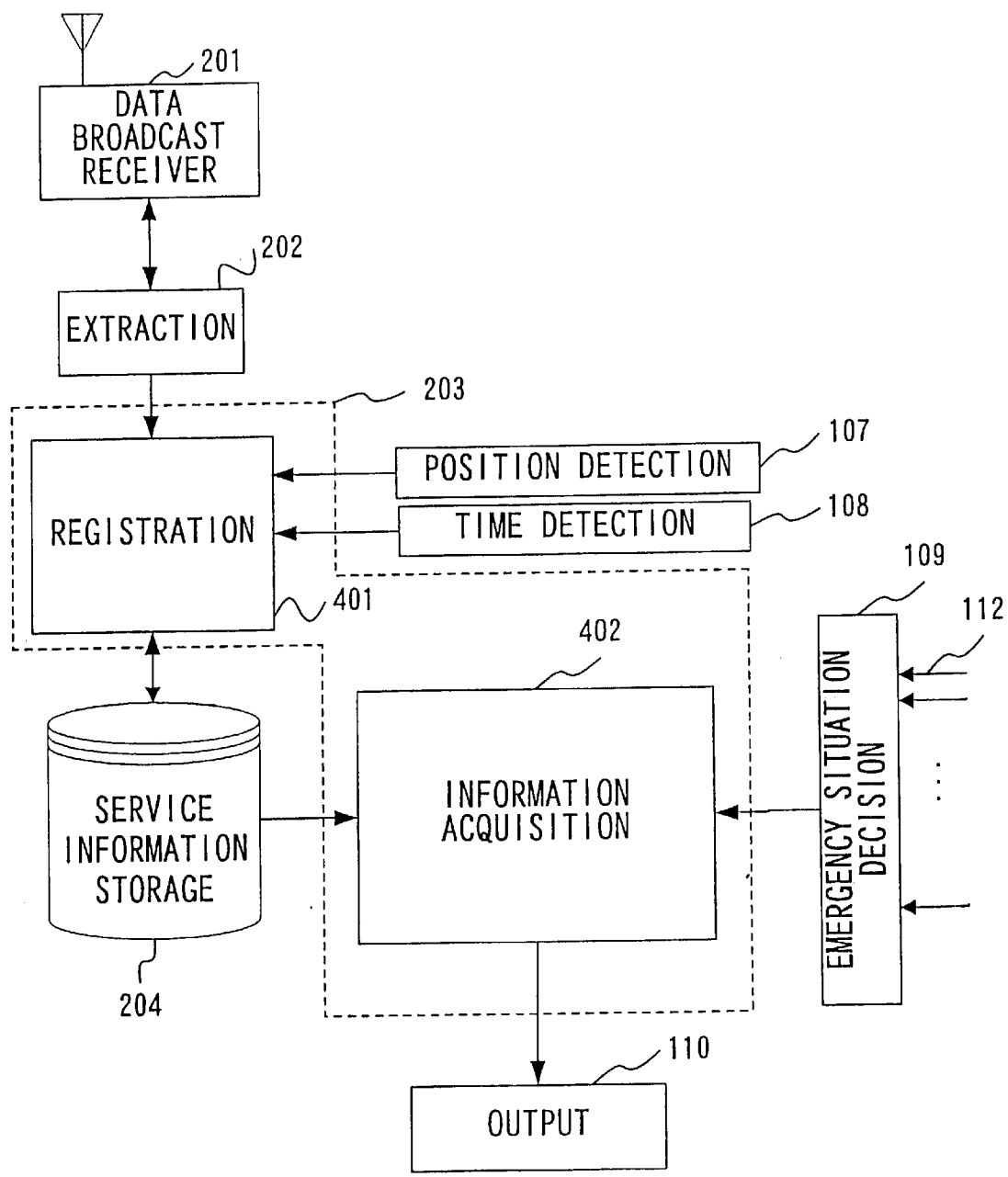
FIG. 4 is a block diagram of an embodiment of a type 2 system of the second aspect of the present invention.

Referring to FIG. 4, the information registration acquisition unit 203 according to another embodiment of the second aspect of the invention pertinent to the type 2 system is made up of a registration unit 401 for sorting the service purveyor information, as extracted by the extraction unit 202, so that only an optimum one of the service purveyor information of the same type name will be registered, and for registering the sole service purveyor information in the service information storage unit 204, and an information acquisition unit 402 for acquiring the service purveyor information having the same type name as the type name determined by the emergency situation decision unit 109 to output the so-acquired service purveyor information at the output device 110.

As in the case of the type 1 system, the data broadcast receiver 201 is enabled to receive a preset broadcast channel, during the time an ignition switch of the automotive vehicle is turned on, and outputs the received information at all times to the extraction unit 202. When the service purveyor (s) information is presented in the received information, the extraction unit 202 extracts the information to output it to the registration unit 401. If no service purveyor information of the same type name as that of the service purveyor information provided by the extraction unit 202 has been stored in the service information storage unit 204, the registration unit 401 stores the service purveyor information now extracted in the service information storage unit 204. If the service purveyor information of the same type name as that of the service purveyor information now extracted has already been stored, it is checked, based on the current time point detected by the time detection device 108 and on the current position of the own automotive vehicle as detected by the position detection device 107, which of the service purveyor information already stored and the service purveyor information now extracted is more desirable. If the service purveyor information already stored is more desirable, the service purveyor information now extracted is discarded, whereas, if the service purveyor information now extracted is more desirable, the service purveyor information already stored is deleted to store the service purveyor information now extracted. It is noted that the registration unit 401 verifies that the service purveyor information which enables the user to reach the service purveyor (or vice versa) within the business time judging from the current time point, and the place of business of which is closer to the current position of the automotive vehicle, is the more desirable service purveyor information.

In this manner, one service purveyor information of the service purveyor information as aired by data broadcast which is more desirable for the own automotive vehicle is stored in the service information storage unit 204, from one type name to another.

On the other hand, if a control signal 112 corresponding to the unusual event of a automotive vehicle is produced from a automotive vehicle control device, not shown, the emergency situation decision unit 109 decides the type name indicating the type of the service corresponding to the unusual event of the automotive vehicle, as in the case of the type 1 system, and outputs the so-determined type name to the information acquisition unit 402. The information acquisition unit 402 acquires from the service information storage unit 204 the service purveyor information having the same type name as such type name and outputs at least its contents information from the output device 110 to the automotive vehicle driver. In this manner, the automotive vehicle driver is able to acquire the information pertinent to the service purveyor from whom the automotive vehicle driver is able to receive the service helpful to solve the emergency situation that has occurred.

Figure 5:
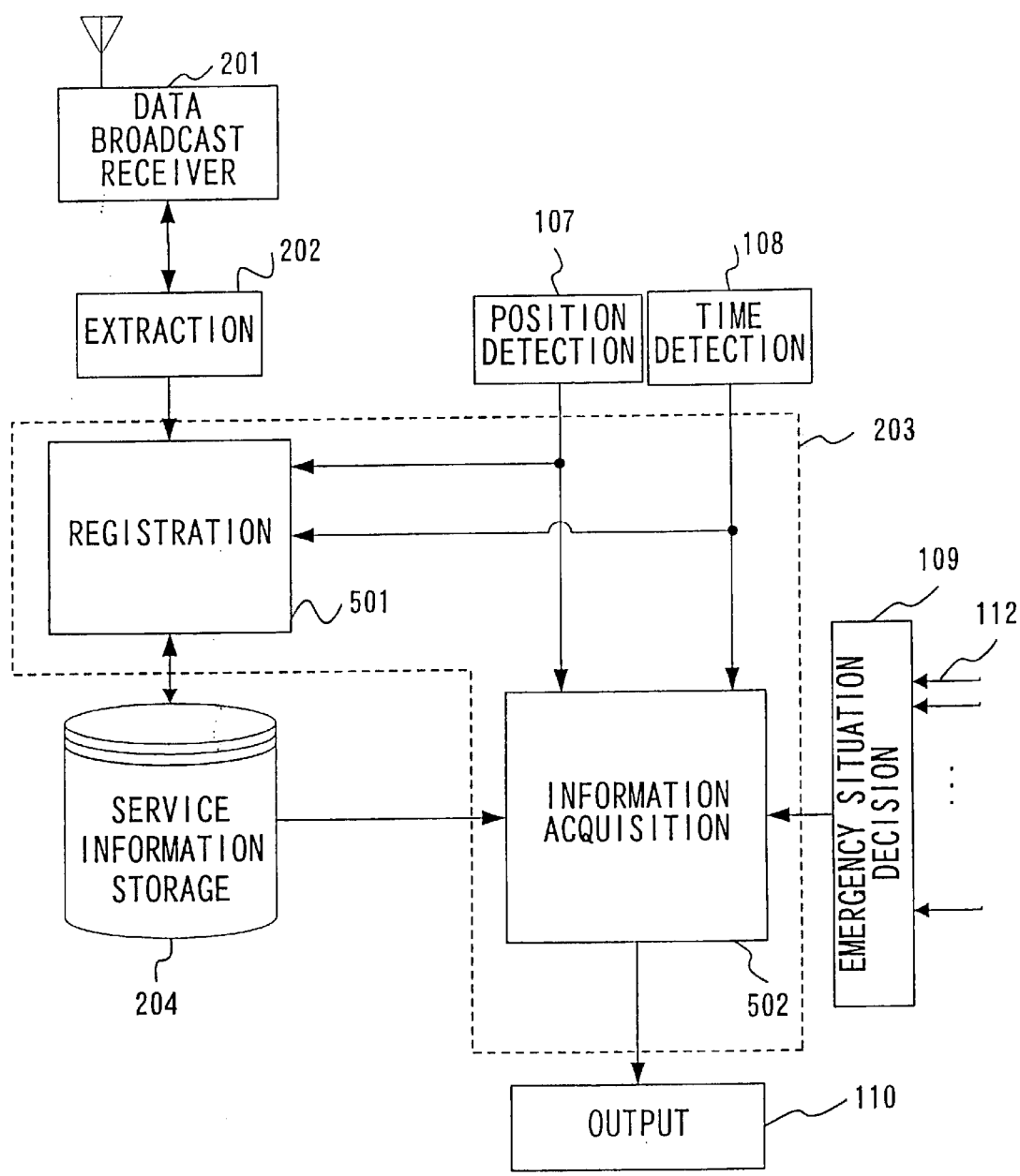
FIG. 5 is a block diagram of an embodiment of a type 3 system of the second aspect of the present invention.

Referring to FIG. 5, the information registration acquisition unit 203 according to still another embodiment of the second subject-matter of the invention pertinent to the type 3 system is made up of a registration unit 501 for sorting the service purveyor information as extracted by the extraction unit 202, so that, of the service purveyor information having the same type name, only more desirable upper N service purveyors information will be sorted and registered in the service information storage unit 204, and an information acquisition unit 502 for retrieving from the service information storage unit 204 the optimum service purveyor information which enables the automotive vehicle driver to receive the service useful to overcome the emergency situation that has occurred, and for outputting the so-retrieved service purveyor information.

As in the case of the type 1 system, the data broadcast receiver 201 is enabled to receive a preset broadcast channel, during the time an ignition switch of the automotive vehicle is turned on, and outputs the received information at all times to the extraction unit 202. When the service purveyors information is presented in the received information, the extraction unit 202 extracts the information to output it to the registration unit 501. If N service purveyors information of the same type name as that of the service purveyor information provided by the extraction unit 202 has not been stored in the service information storage unit 204, the registration unit 501 stores the service purveyor(s) information now extracted in the service information storage unit 204. If a number N of service purveyor information of the same type name as that of the service purveyor information now extracted have already been stored, it is checked, based on the current time point detected by the time detection device 108 and on the current position of the own automotive vehicle as detected by the position detection device 107, which of the service purveyor information already stored as the lowest order and the service purveyor information now extracted is more desirable. If the service purveyor information of the lowest order already stored is more desirable, the service purveyor information now extracted is discarded, whereas, if the service purveyor information now extracted is more desirable, the service purveyor information of the lowest order already stored is deleted to store the service purveyor information now extracted. It is noted that the registration unit 401 verifies that the service purveyor information which enables the user to reach the service purveyor (or vice versa) within its business time judging from the current time point and the place of business of which is closer to the current position of the automotive vehicle is the more desirable service purveyor information.

In this manner, a number N of upper order service purveyors information of the service purveyors information, aired by data broadcast, and which is more desirable for the own automotive vehicle, are stored in the service information storage unit 204, from one type name to another.

If a control signal 112 indicating an unusual occurrence of the automotive vehicle is generated from an automotive vehicle control device, not shown, the emergency situation decision unit 109 decides the type name indicating the type of the service helpful in eliminating the emergency situation to output the type name so determined to the information acquisition unit 502, as in the type 1 system. The information acquisition unit then retrieves, from the service information storage unit 204, the optimum service purveyor information capable of furnishing the service useful in overcoming the emergency situation that has occurred, based on the type name, current position of the own automotive vehicle as detected by the position detection device 107 and the current time as detected by the time detection device 108, and outputs at least the contents information from the output device 110 to the automotive vehicle driver. The information acquisition unit 502 selects, from the service purveyors information stored in the service information storage unit 204, the service purveyor(s) information having the type name as that determined by the emergency situation decision unit 109, if accessible within the business time judging from the current time and the place of business of which is closer to the current position of the automotive vehicle, as being the optimum service purveyor information. This enables the automotive vehicle driver to acquire the information pertinent to the optimum service purveyor from whom can be acquired the service useful in overcoming the emergency situation that has occurred.

Embodiments

Referring to the drawings, certain preferred embodiments of the present invention will be explained in detail.

Figure 6:
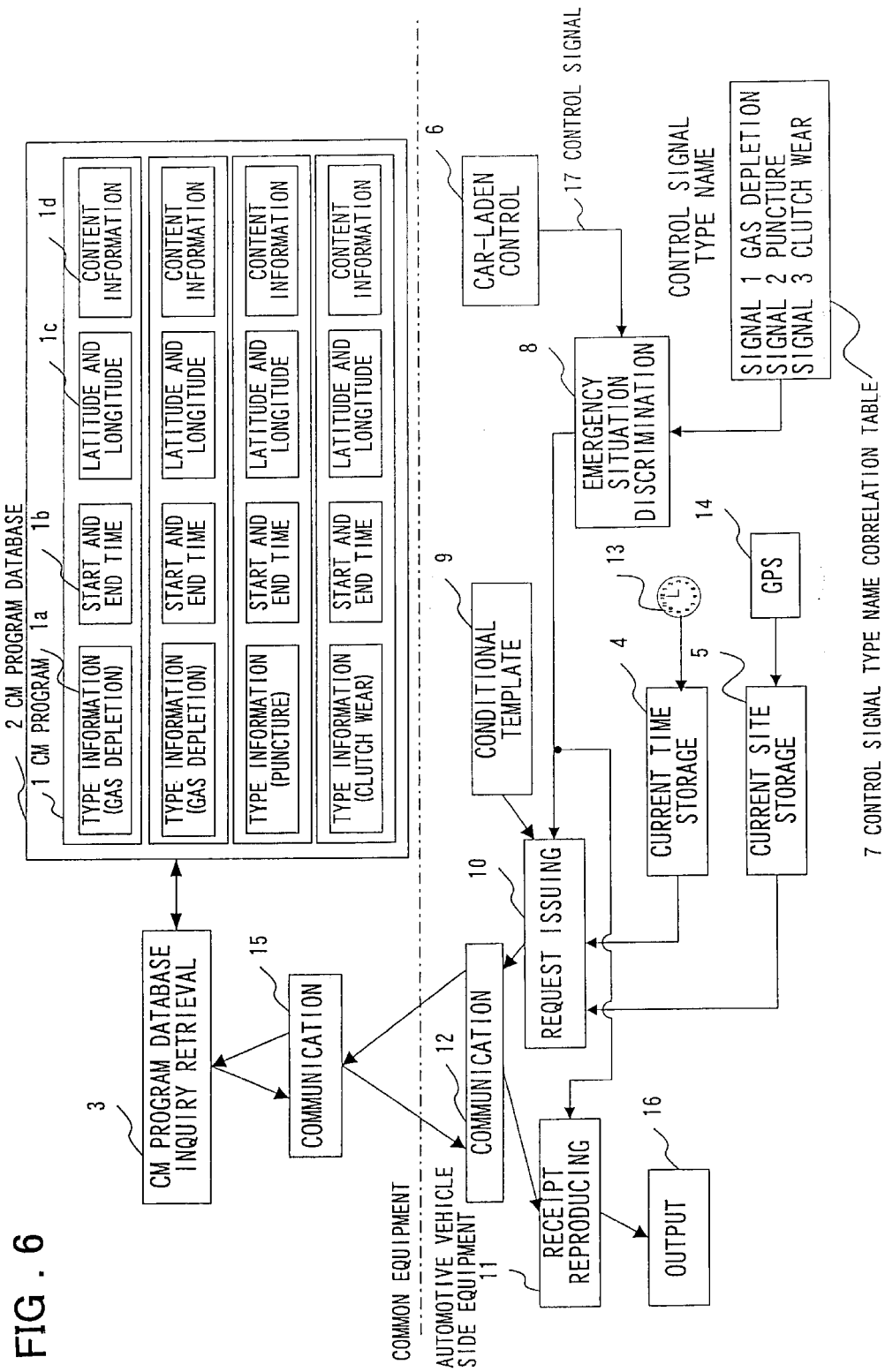
FIG. 6 is a block diagram of an embodiment of the first aspect of the present invention.

First, an embodiment of the first aspect of the present invention is explained. Referring to FIG. 6, a preferred embodiment of the first aspect of the invention includes, as a common equipment provided at a center, a CM program database 2, a CM program database inquiry retrieval unit 3 and a communication device 15, while also including, as equipment provided on each automotive vehicle, a current time storage unit 4, a current place storage unit 5, a car-laden control device 6 a control signal type name correlation table 7, an emergency situation discrimination unit 8, a conditional template storage unit 9, a request issuing unit 10, a receipt reproducing unit 1, a communication device 12, a timepiece 13, a GPS (global positioning system) 14 and an output device 16.

As for the relationship to FIG. 1, the CM program database 2, CM program database inquiry retrieval unit 3 and the communication device 15 correspond to the service information storage unit 105, information retrieval unit 106 and to the communication device 102, respectively. On the other hand, the time piece 13 and the current time storage unit 4 correspond to the time detection device 108, whilst the GPS 14 and the current site storage unit 5 correspond to the position detection device 107. The control signal type name correlation table 7 and the emergency situation discrimination unit 8 correspond to the emergency situation decision unit 109. The communication device 12 and the output device 16 correspond to the communication device 103 and to the output device 110, respectively, while the conditional template storage unit 9, the request issuing unit 10 and the receipt reproducing unit 11 correspond to the information acquisition unit 111. The control signal 17 issued by the car-laden control device 6 corresponds to the control signal 112. Meanwhile, the current time storage unit 4, current site storage unit 5, control signal type name correlation table 7, emergency situation discrimination unit 8. conditional template storage unit 9, request issuing unit 10 and the receipt reproducing unit 11 can be realized by a computer, such as a personal computer that can be run under program control.

The CM program database 2 is a database in which a large number of CM programs 1 are loaded. The individual CM program 1 is made up of the type information 1a, time information 1b, place information 1c and the content information 1d. The type information 1a indicates the sort of service furnished by a sponsor (service purveyor) of the CM in question, the time information 1b indicates the business time during which the service is offered and the place information 1c indicates the place (place of business) such as a store (or station) furnishing the service. The content information 1d is the contents of the CM itself and includes at least the name of the sponsor (service purveyor).

In the case of a CM program of a gasoline station, for example, the type information 1a denotes "gas depletion", whilst the time information 1b denotes the opening time of the gasoline station, such as "from 7 to 21". In actual terms, it is represented by two fields, namely the shop opening time field and the shop closure time field. In the present embodiment, the time information 1b is represented solely by the shop opening time (START TIME) and shop closure time (END TIME). However, since there are such shops which set every Monday as shop holiday or which set 5th, 15th and 25th every month, as shop holidays, it is necessary to add fields to represent these shop holidays. However, since these exceptions can readily be inferred from the present invention, it is assumed here that there are provided only fields of the shop opening time and the shoe closing time. The place information 1c denotes the position information (latitude and longitude information) of the gasoline station in question. In actual terms, the place is represented by two fields, namely the latitude field and the longitude field. As or the content information 1*d*, the contents of the CM are saved in e.g., WAVE form or MP3 (MPEG Audio Layer-3) if the data is the audio data.

As the CM program database 2, any suitable pre-existing commerce-related database management system (RDBMS) may be used. In this case, the CM program 1 is stored as each record of the RDBMS, with the type information 1*a*, time information 1*b*, place information 1*c* and the content information 1*d* being stored in respective different fields.

If fed with an inquiry message including the type information, time information or conditional formula pertinent to the place information, from the automotive vehicle equipment through the communication device 15, the CM program database inquiry retrieval unit 3 retrieves the CM program database 2 to take out the CM program 1 coincident with the condition to take out the corresponding CM contents (contents information) to transmit the contents information as taken out through the communication device 15 to the automotive vehicle side equipment as an originating point of the request. If the CM program database 2 is the RDBMS, the conditional formula is the formula stated in the SQL language. So, the CM program database inquiry retrieval unit 3, fed with the SQL retrieval formula, delivers it to the RDBMS, which then returns the value of the CM contents field of the record matched to the SQL retrieval formula. The CM program database inquiry retrieval unit 3 receives the value to output it directly.

The communication devices 15, 12 are telephone sets. Of these, the communication device 12 as the automotive vehicle side equipment needs to be a radio telephone set, such as a portable telephone set. However, the communication device 15 on the side common equipment may be of any type if it is able to communicate with the communication device 12 as the automotive vehicle side equipment by exploiting the communication infrastructure.

The current time storage unit 4 is a storage unit for holding the latest current time. To this end, it suffices if an ordinary timepiece 13 is installed in a automotive vehicle and the value of the timepiece 13 is read out periodically for storage in a memory. The periodic time interval may, for example, be one minute.

The current site storage unit 5 is a storage unit for holding the latest place information of an own automotive vehicle. It is sufficient if a GPS 14 routinely used in e.g., the car navigation is installed in a automotive vehicle and the value of the GPS 14 is read out periodically for storage in a memory. The periodic time interval may, for example, be one minute.

The car-laden control device 6 is a control device for detecting emergency situations, such as gas depletion, puncture, clutch wear or engine overheating to output a corresponding control signal 17. This sort of the car-laden control device 6, mounted in a majority of automotive vehicles, may be used. However, the control signal, simply used for control purposes such as for alarm display in a vehicle, needs to be input to the emergency situation discrimination unit 8 as well.

The control signal type name correlation table 7 is a table stating the relation of correspondence between a variety of control signals issued from the car-laden control device 6 and the type names of the related CM programs. The table may be realized by, for example, a memory.

When the control signal 17 is output from the car-laden control device 6, the emergency situation discrimination unit 8 references the control signal type name correlation table 7 to identify the type name associated with the output control signal 17 to issue the type name to the request issuing unit 10.

The conditional template storage unit 9 has stored therein a conditional formula template representing the method for formulating the conditional formula. As the conditional formula template, there are, for example, the following SQL retrieval formulas including the following four variables:

Type: type name

Time: current time information

PositionX: current place information (latitude)

PositionY; current place information (longitude)

These variables are used for storage of input data furnished from outside.

The conditional formula is the retrieval formula stated in the SQL language and ii of the following form:

SELECT CM content information FROM CM program table

> WHERE type=Type AND Time>shop start time AND Time<shop end time AND square root (PositionX−latitude) multiplied by itself+(PositionY−latitude) multiplied by itself<threshold value This formula has the following meaning:

"From the records of the CM program table, take out a record in which the value of the type name field is Type, the value of the shop opening (start) time field is smaller than Time, the value of the shop closure (end) time field is larger than Time, and in which the distance between (PositionX, PositionY) and (latitude field, longitude field) is smaller than the value of the threshold value provided at the outset, and return the value of the CM content field of the record".

As for the PositionX and the PositionY, it is only when the automotive vehicle is just passing the shop site at the very time instant that the position of the shop stated in the CM program (latitude field, longitude field) fully coincides with the current position (PositionX, PositionY). Since this occurs only on extremely rare occasions, it would be more realistic that, if the position parameters (latitude field, longitude field) are different from (PositionX, PositionY) only within a certain distance range, that is less than the value of a pre-set threshold, the two are deemed to coincide with each other. The aforementioned conditional formula takes account of this approximation.

The request issuing unit 10 specifies the condition for the common equipment to ask for acquisition of a CM program. On receipt of a type name corresponding to the emergency situation from the emergency situation discrimination unit 8, the request issuing unit 10 takes out a template of the SQL retrieval formula stored in the conditional template storage unit 9 to substitute values for the four variables (Type, Time, PositionX and PositionY) in the SQL retrieval formula to complete the SQL retrieval formula. First, the request issuing unit 10 substitutes the type name received from the emergency situation discrimination unit 8 into Type. The request issuing unit 10 takes out the current time stored in the current time storage unit 4 to substitute it for Time. The request issuing unit 10 also takes out the current place stored in the current place storage unit 5 to substitute it for PositionX and PositionY. Finally, an inquiry message comprehending the SQL retrieval formula completed by the above substitution is transmitted through the communication device 12 to the CM program database inquiry retrieval unit 3. The request issuing unit 10 is also responsible for control of starting the communication device 12 to make the communication device issue a call.

The receipt reproducing unit 11 receives from the communication device 12 the contents of the CM program, representing the result of retrieval of the CM program database inquiry retrieval unit 3, to reproduce the contents by the output device 16, to present the contents of the CM program to e. g., a driver in the automotive vehicle. If the contents of the CM program are a file of the WAVE form, the program of reproducing the WAVE file is executed. If the contents of the CM program are file of the MP3 form, the program of reproducing the MP3 file is executed. These programs are commercially available as e.g., software on the Windows. In this case, the output device 16 is made up of an amplifier and a loudspeaker. In the present embodiment, the type name output by the emergency situation discrimination unit 8 is also sent to the receipt reproducing unit 11, which then reproduces the preset emergency message comprehending the type name by the output device 16 by e.g., speech synthesis. So, if the type name is e.g., "clutch worn", there is issued a message reading: "the clutch has worn . . . the useful CM information now is being acquired" and the contents of the CM program acquired subsequently is reproduced.

Figure 7:
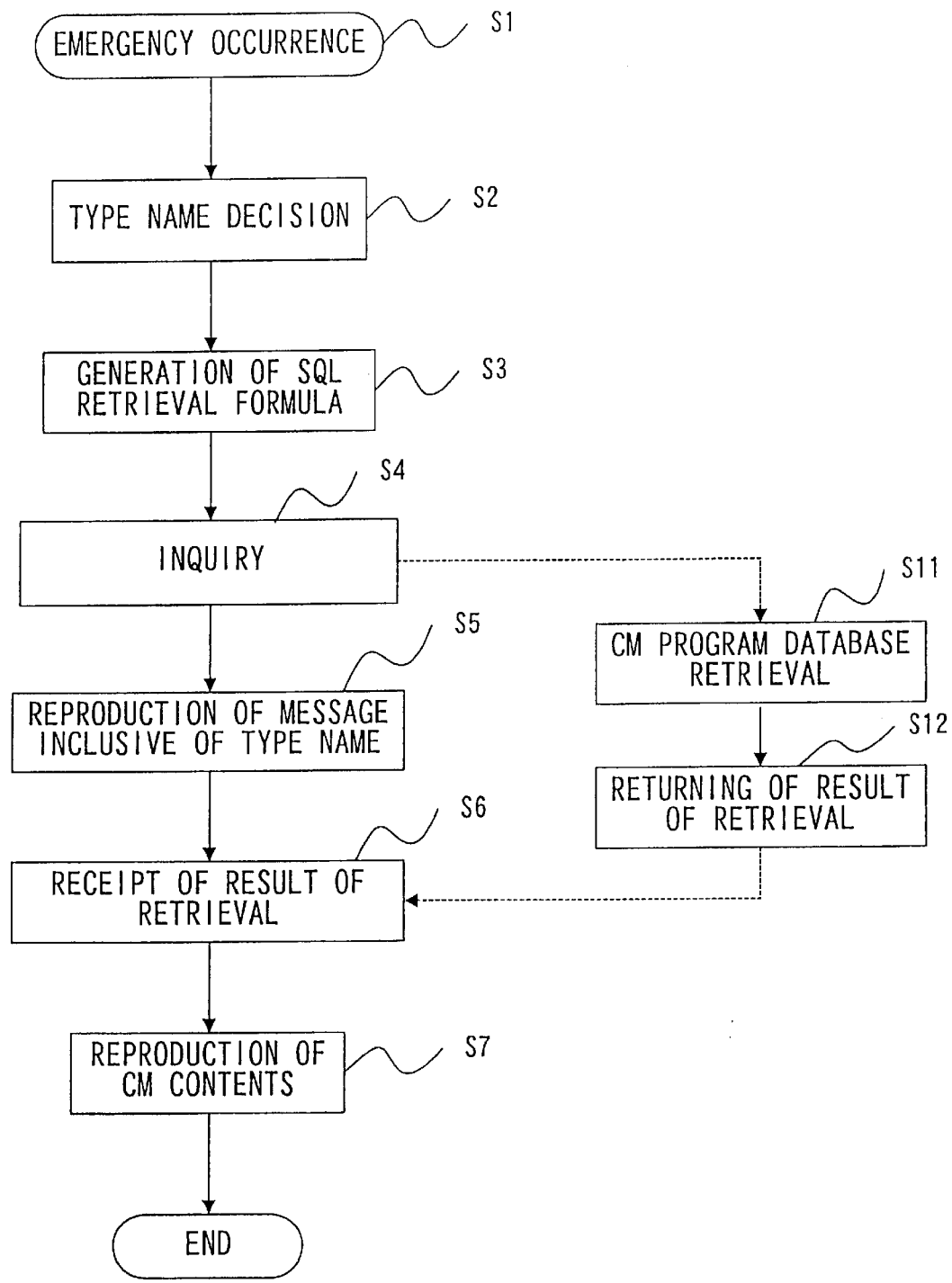
FIG. 7 is a flowchart showing schematics of the processing of an embodiment of the first aspect of the present invention.

FIG. 7 is a flowchart showing the schematics of the processing of the present embodiment. If an emergency situation such as gas depletion has occurred in an automotive vehicle (S1), a control signal 17 associated with the emergency situation that has occurred is issued from the car-laden control device 6 to the emergency situation discrimination unit 8 so that the type name is determined based on the control signal type name correlation table 7 (S2). The request issuing unit 10 then generates the SQL retrieval formula, using the conditional formula template, based on the so-determined type name, current time and the current place (S3), and makes an inquiry at the CM program database inquiry retrieval unit 3 through the communication device 12 (S4). On the other hand, the receipt reproducing unit 11 reproduces the message, comprehending the so-determined type name, to output the reproduced message at the output device 16 (S5).

The CM program database inquiry retrieval unit 3 retrieves the CM program database 2 with the SQL retrieval formula, so received (S11), to return the content information 1d of the CM program 1, matched o the SQL retrieval formula, through the communication device 15 as the retrieved result (S12). If there are plural matched CM programs, these programs may be returned in their entirety, or an optional one of the programs may be returned. In the absence of the matched CM program, the aforementioned threshold value pertinent to the place in the SQL retrieval formula may be relaxed for re-try automatically.

On receipt of the retrieved results through the communication device 12 (S6), the receipt reproducing unit 11 reproduces the CM content by the output device 16 (S7).

Figure 8:
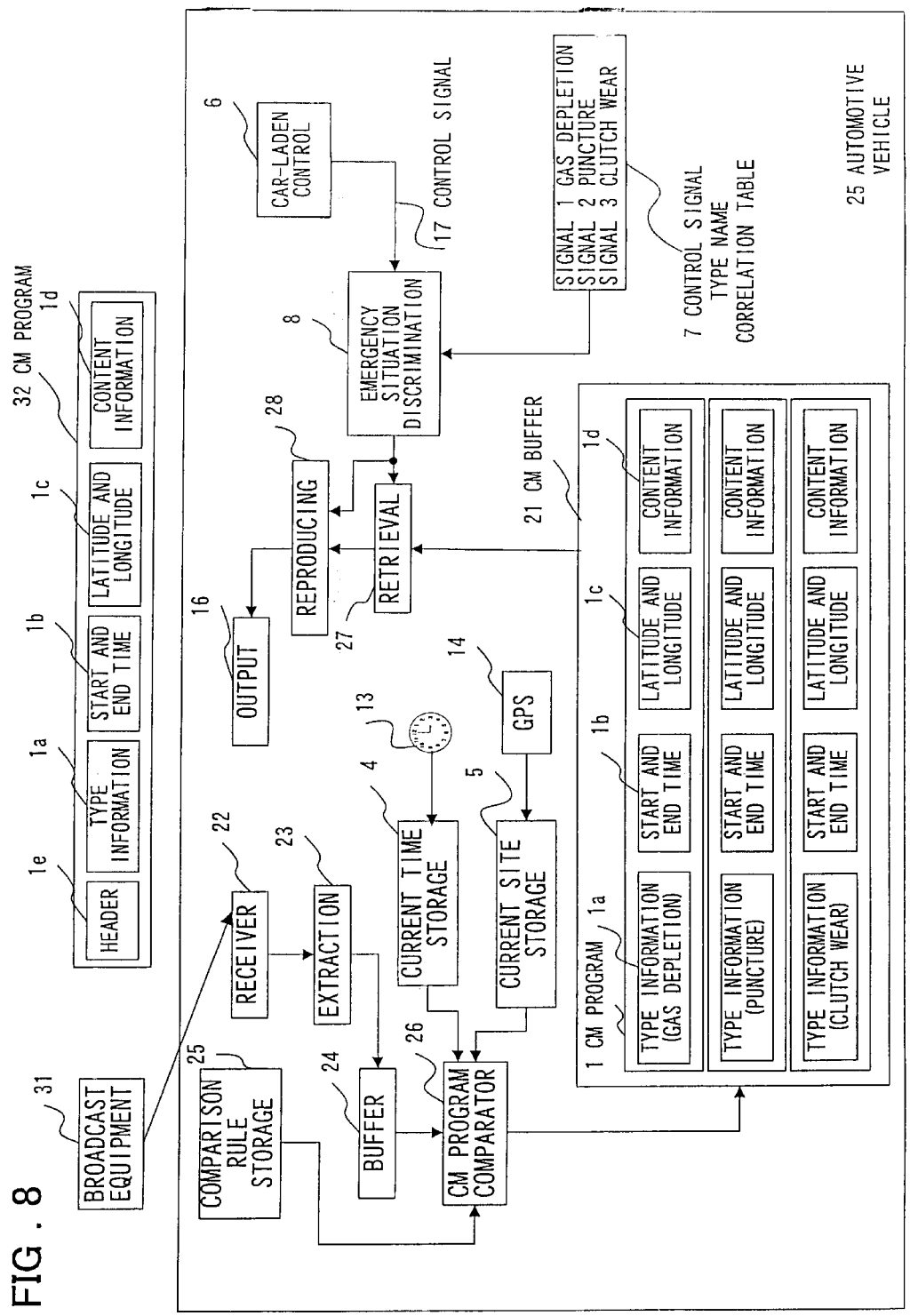
FIG. 8 is a block diagram of an embodiment of a second aspect of the present invention

An embodiment of the second aspect of the present invention is now explained. Referring to FIG. 8, the embodiment of the second aspect of the present invention is the embodiment pertaining to the aforementioned type 2 system, and includes, in addition to the current time storage unit 4, current site storage unit 5, car-laden control device 6, control signal type name correlation table 7, emergency situation discrimination unit 8, timepiece 13 and the GPS 14, a CM buffer 21, a receiver 2, an extraction unit 23, a buffer 24, a comparison rule storage unit 25, a CM program comparator 26, a retrieval unit 27 and a reproducing unit 28. Meanwhile, the reference numeral 31 denotes a broadcast equipment and 32 a CM program aired from the broadcast equipment 31.

As for the relationship to FIG. 4, the CM buffer 21, receiver 22 and the extraction unit 23 correspond to the service information storage unit 204, data broadcast receiver 201 and to the extraction unit 202, respectively , while the timepiece 13 and the current time storage unit 4 correspond to the time detection device 108. The GPS 14 and the current site storage unit 5 correspond to the position detection device 107, whilst the control signal type name correlation table 7 and the emergency situation discrimination unit 8 correspond to the emergency situation decision unit 109. The output device 106 corresponds to the output device 110, while the output device 16 and the reproducing unit 28 correspond to the output device 110 and to the information acquisition unit 402, respectively. Meanwhile, the current time storage unit 4, current site storage unit 5, control signal type name correlation table 7, emergency situation discrimination unit 8, CM buffer 21, extraction unit 23, buffer 24, CM program comparator 26, retrieval unit 27 and the reproducing unit 28 may be realized by a computer, such as a Program-controlled personal computer.

The broadcast equipment 31 is such a broadcast equipment having the data broadcasting function such as satellite digital radio broadcasting, ground wave digital audio broadcasting or FM teletext broadcasting. The present invention is not limited by details of these broadcast equipment.

The CM program 32, aired by data broadcast from the broadcast equipment 31, includes the type information 1a, time information 1b, place information 1c and the content information 1d, similar to those of the CM program 1 in the embodiment of FIG. 6. In addition, the CM program 32 includes a header 1e indicating that the program 32 is the CM program.

The receiver 22 may, for example, be a tuner for receiving the data aired from the broadcast equipment 31. The present invention is not limited by detail Is of these broadcast equipment. It is possible to use existing data broadcast receivers.

The extraction unit 23 is adapted for extracting the CM program 32 from the data received by the receiver 22. To this end, the header 1e is used to verify whether or not the program in question is the CM program.

The buffer 24 temporarily stores the CM program 32 extracted by the extraction unit 23 and is formed by a memory.

The CM buffer 21 is a buffer for storing one CM program for each commercial type. The number N of the CM programs 1 stored in the CM program 32 is equal to the number N of the commercial types. Since the number of the types is not that many, a small number of the CM buffer 21 suffices. The CM programs 1 are formed by the type name 1a, time information 1b, place information 1c and the content information 1d, as in the embodiment of FIG. 6.

The comparison rule storage unit 25 includes a judgment rule stating a method of comparing two CM programs bearing the same type name and selecting a more appropriate one taking into account the current event, that is the current time and the current place. There are a variety of judgment methods, and the judgment rule differs accordingly. Examples of these judgement methods include:

"First, the opening time is checked and, if only one shop is open, the open store is selected";

"If both shops are open, a shop lying closer to the current place is selected";

"However, if, with one of the shops, the time since the opening time until the shop close time is less than 30 minutes, then it is probable that the shop is closed at the time of arrival, so this shop is not selected even if it is near"; and "If the shop opening time is less than 30 minutes, the shop will be opened, even if it is closed at present, so this shop is deemed to be open".

The corresponding flowchart is shown in FIG. 9.

In FIG. 9, the value setting of time for variables such as CM1. OpenTime or CM1. Closed Time being retrograded by 30 minutes represents a rule that a shop is to be deemed open even if the shop is opened only after 30 minutes, or that a shop is to be deemed closed even if the shop is kept open for 30 minutes from now on. Although not stated in the foregoing description, there is included such a description that, if the CM program of the corresponding to the type name has not been stored in the CM buffer, a newly received CM program is selected and stored in the CM buffer, and the corresponding description is to be included.

Figure 10:
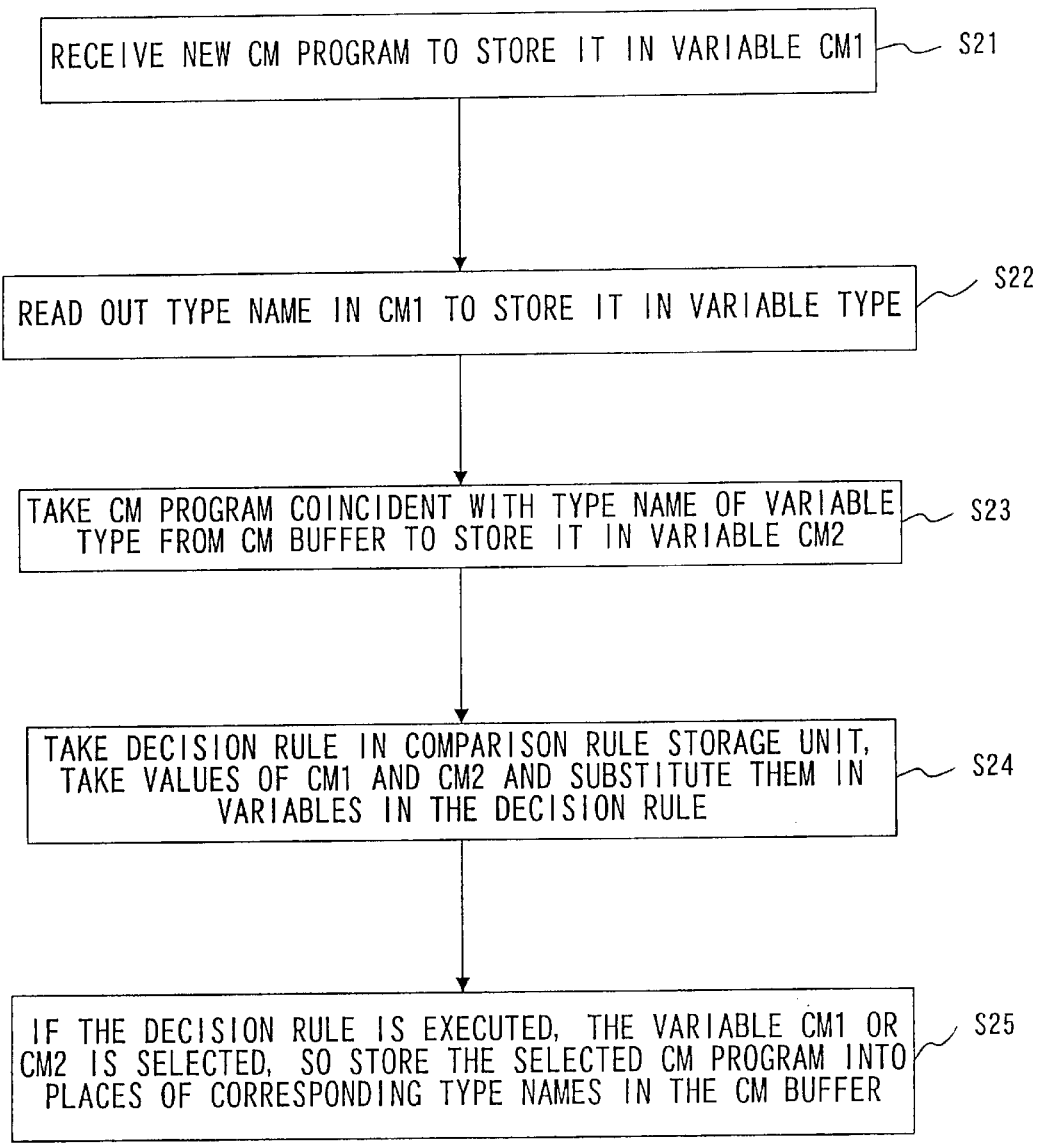
FIG. 10 is a flowchart showing a typical processing by a CM program comparator.

The CM program comparator 26 is used for sorting the CM program 32 stored in the buffer 24 for registration in the CM buffer 21. Specifically, if a new CM program 32 is stored in the buffer 24, the CM program having the same type name as the type name of the new CM program is taken out and the judgment rule of the comparison rule storage unit 25 is applied as reference is made to the values of the current time storage unit 4 and the current site storage unit 5. If the new CM program is verified to be better, the new CM program is stored in the CM buffer 21 and, if otherwise, the contents of the CM buffer 21 are not updated. FIG. 10 shows a typical processing by the CM program comparator 26.

First, a new CM program is received from the buffer 24 and stored in the variable CM1 (S21). The type name in the variable CM1 then is read out and stored in the variable Type (S22). The CM program coincident with the type name of the variable Type is read out from the CM buffer 21 for storage in the variable CM2 (S23). The judgment rule of the comparison rule storage unit 25 then is taken out and values in CM1 and CM2 are taken out and substituted into the variable (S24). If the judgment rule is executed, the variable CM1 or the variable CM2 is selected, so that the selected CM program is overwritten in the place of the corresponding type name in the CM buffer 21 (S25).

The retrieval unit 27, fed with the type name from the emergency situation discrimination unit 8, takes out the CM program having the same type name from the CM buffer 21 and delivers the content information 1d to the reproducing unit 28.

The reproducing unit 28 is responsible for replay of the content information delivered from the emergency situation discrimination unit 8. The reproducing unit 28 is analogous to the receipt reproducing unit 11 of FIG. 6, and executes the program the contents of the CM program of which corresponds to the stored form (WAVE form or the MP3 form). The reproducing unit 28 reproduces a preset emergency message, comprehending the type name, output from the emergency situation discrimination unit 8, by the output device 16 by e.g., speech synthesis, followed by the contents of the CM program. Thus, if the type name is "clutch worn", the information which reads: "clutch has worn . . . the CM information currently useful is . . . (contents of the CM program) . . . " is reproduced from the output device 16.

Figure 11:
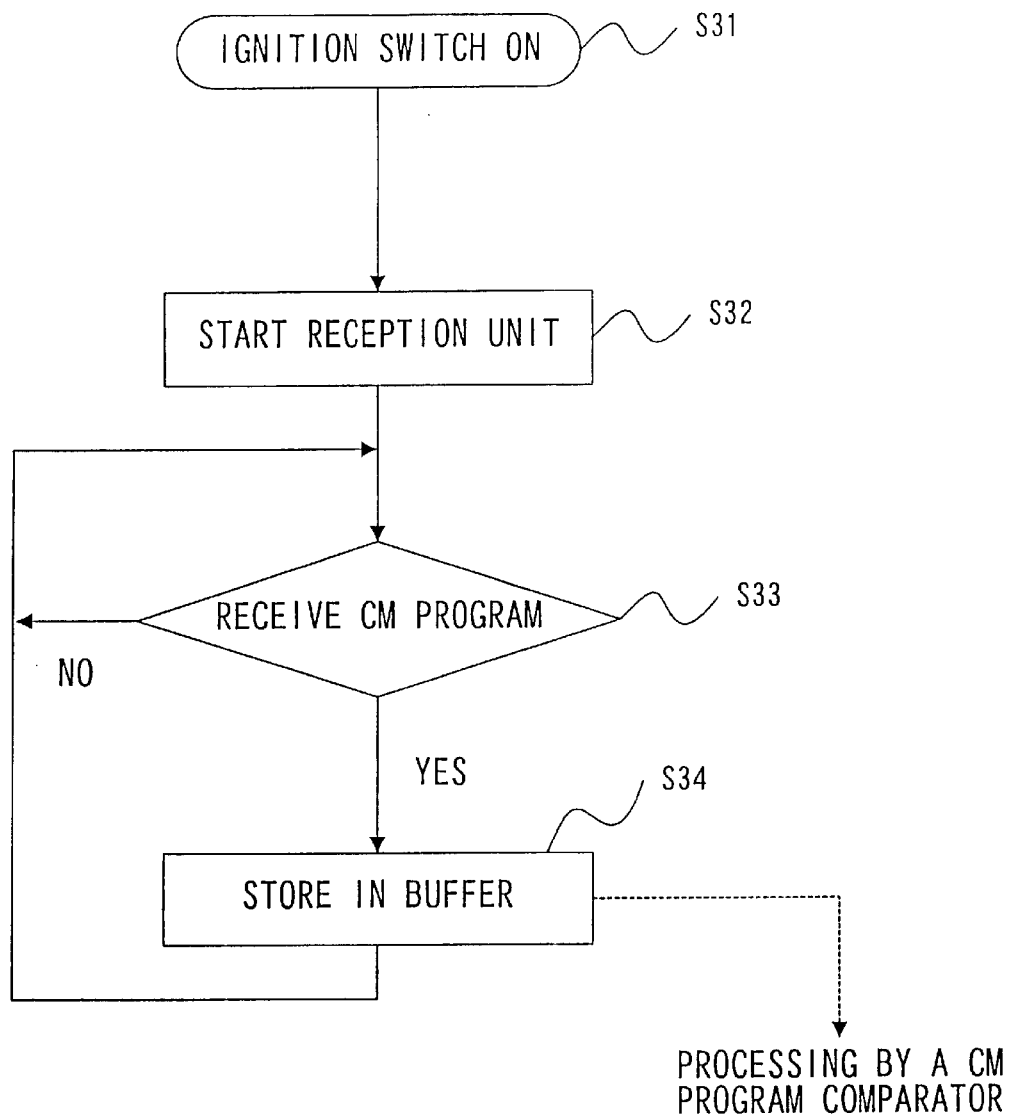
FIG. 11 is a flowchart showing schematics of the processing of an embodiment of the second aspect of the present invention.
Figure 12:
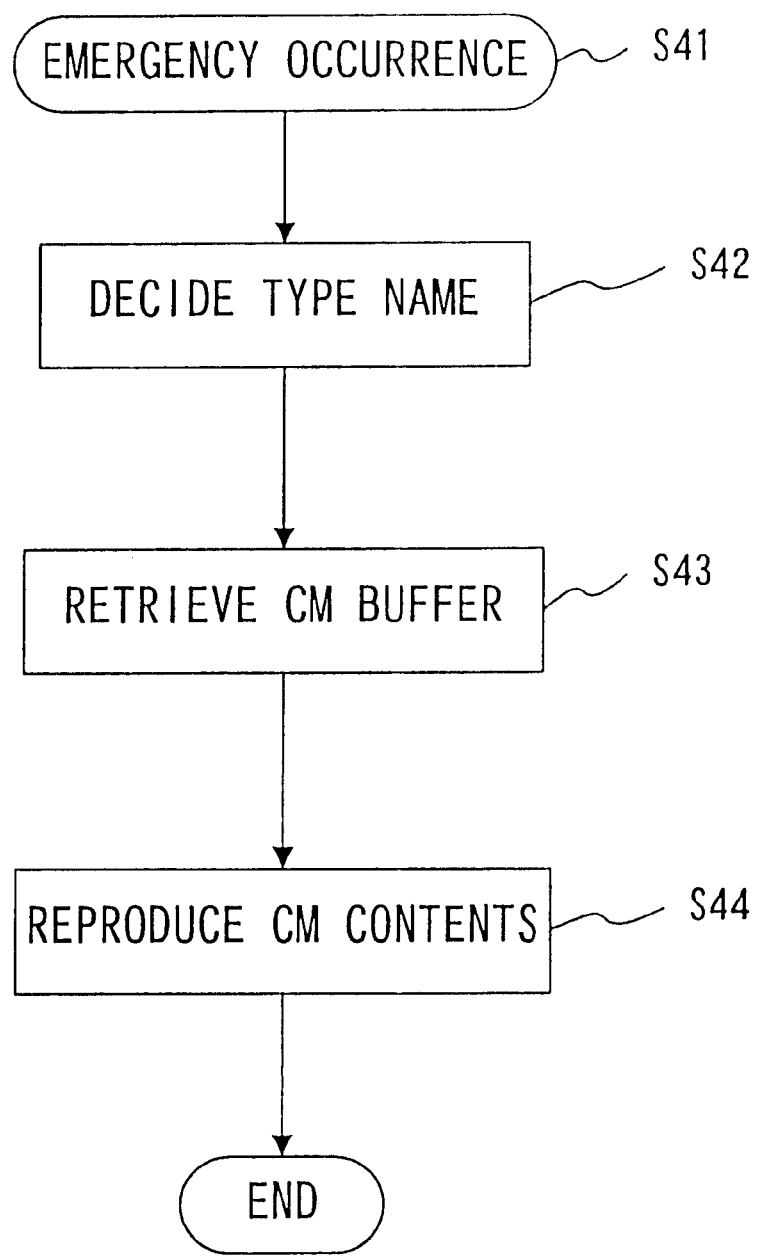
FIG. 12 is a flowchart showing schematics of the processing of an embodiment of the second aspect of the present invention.

FIGS. 11 and 12 are flowcharts illustrating th schematics of the processing in the present embodiment. If an ignition switch of an automotive vehicle is turned on (S31 of FIG. 11), the receiver 22 is started (S32). The receiver 22 is pre-set for receiving the predetermined data broadcast channel. So, if started, the receiver 22 starts receiving data broadcast on the channel to output the received data to the extraction unit 23. The extraction unit 23 is fed with the data output from the receiver 22 and extracts the CM program 32 each time the program presents itself. This sequence of operations is repeated (S33 and S34). The CM program 32 stored in the buffer 24 is sorted by the CM program comparator 26 for storage in the CM buffer 21.

Figure 13:
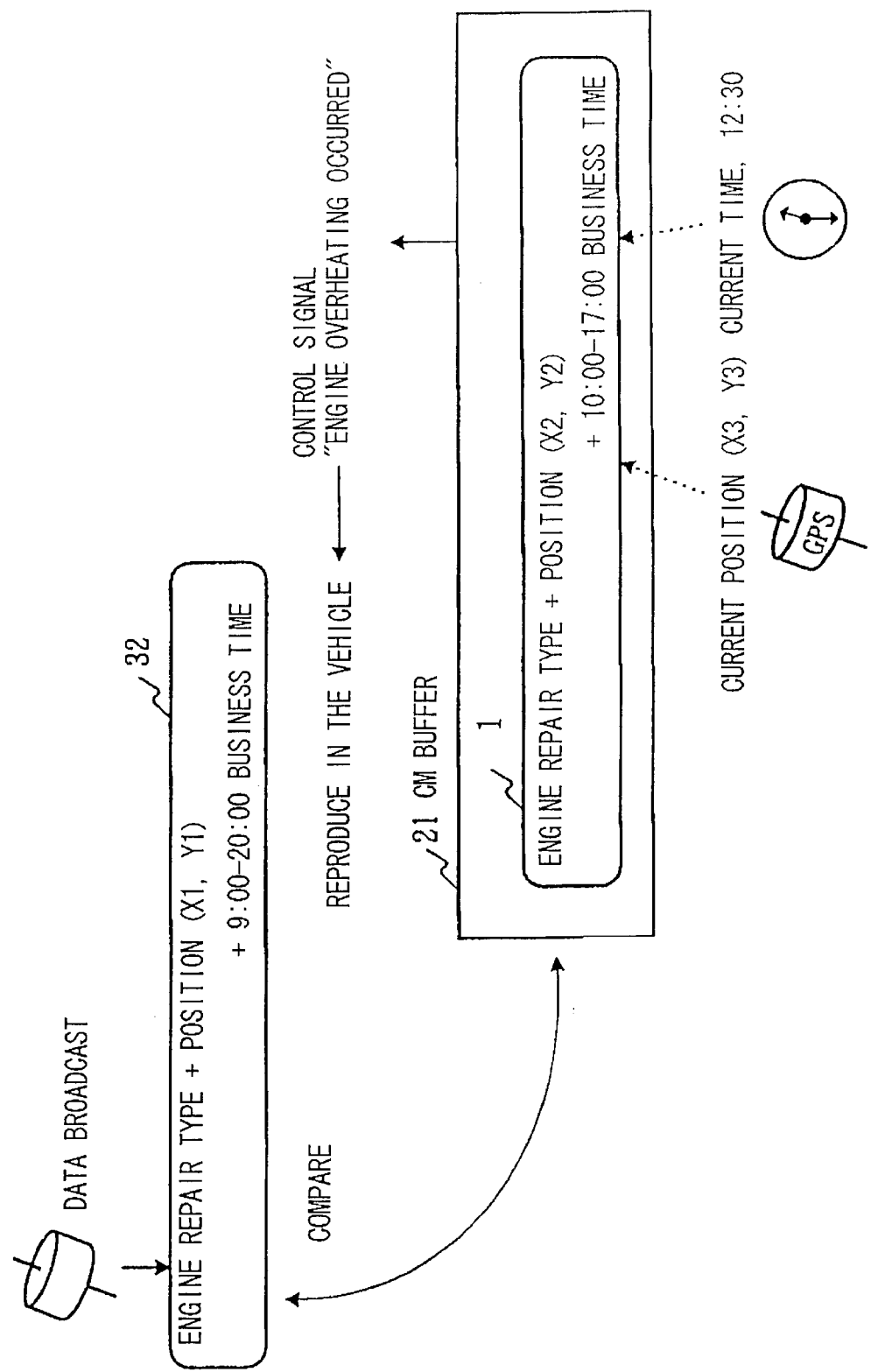
FIG. 13 shows the operation of an embodiment of the second aspect of the present invention.

For example, it is assumed that the CM program 32 of the automotive vehicle repair shop has been aired, as shown in FIG. 13. The type of this CM program 32 is to set "engine repair", the place of this shop is represented by the latitude -and longitude as (X1, Y1), with the opening time of this shop being represented by a pair of the shop opening (start) time and the shop closing (end) time. Here, the shop opening time of 9:00 a.m. and the shop closing time of 8:00 p.m. are grouped as a set. On the other hand, it is assumed that a CM program 1 of a shop, which is of the same "engine repair" type but which is a different shop, has a already been stored in the CM buffer 21. In this different shop, the place of business is (X2, Y2), with the shop opening time being 10 a.m. and the shop closing time being 5 p.m. The CM program comparator 26 decides a more appropriate shop from these two CM programs, judging from the current time and the current place. The processing at this time has already been explained with reference to FIG. 10.

The CM programs, furnished via data broadcast, is Perpetually received, even in the normal state in which the emergency situation has not occurred. Of these CM programs, a CM program which is most suited to the current state (place and time) is saved in the CM buffer 21 from one type to another.

Should an emergency situation such as gas depletion occur in an automotive vehicle (S41 of FIG. 12), a control signal 17 corresponding to the emergency situation that has occurred is issued from the car-laden control device 6 to the emergency situation discrimination unit 8, and the type name is determined based on the control signal type name correlation table 7 (S42). The retrieval unit 27 then retrieves the CM program 1, having the type name as the determined type name is retrieved from the CM buffer 21 (S43) to deliver the content information 1d to the reproducing unit 28. The reproducing unit then reproduces the content information, delivered from the reproducing unit 28, next to the preset message comprehending the type name as determined by the emergency situation discrimination unit 8 to output the reproduced information from the output device 16 (S44). If, for example, an engine overheating should occur at a time point when the CM program 1 shown in FIG. 13 is stored in the CM buffer 21, the CM program 1 of the "engine repair" type CM program 1 is taken out from the CM buffer 21 and reproduced.

The embodiment of the type 2 system has been explained above. The embodiment of the type 1 system uses means for storing the CM program stored in the buffer 24 in the CM buffer 21, without sorting, in place of the comparison rule storage unit 25 and the CM program comparator 26 of FIG. 8. Also, the embodiment of the type 1 system uses means for retrieving the optimum CM program from the CM buffer 21, in place of the retrieval unit 27. This retrieval means may be realized by means similar to the conditional template storage unit 9, request issuing unit 10 and the CM program database inquiry retrieval unit 3 in the first embodiment shown in FIG. 6.

The embodiment of the type 3 system uses, as the CM program comparator 26 of FIG. 8, means having a function of narrowing the CM programs of the same type to upper N instead of to one, while using, in place of the retrieval unit 27, means for retrieving an optimum CM program from the CM buffer 21, as in the type 1 system.

Moreover, in the above explanation, only one data broadcasting channel is received. Alternately, plural sets of the receiver 22 and the extraction unit 23 of FIG. 8 may be provided to receive plural data broadcast channels simultaneously to store the CM programs received in the respective stations in the buffer 24. By so doing, it is possible to exploit the CM programs aired by any one or more of the plural data broadcast channels.

Moreover, in the above explanation, an emergency situation detected by the car-laden control device 6 is taken as an example of the emergency situation. However, the present invention may also be applied to an emergency situation issued by control devices other than the car-laden control device 6. An example of the control device other than the car-laden control device 6 may be a center for detecting unusual occurrence in a heart pace maker mounted in a driver or a passenger. In such case, the hospital information needs to be included in the service purveyor information.

In addition, in the foregoing explanation, the content information in the service purveyor information is presented to the automotive vehicle driver. Alternatively, the present system may be interlocked with the car navigation loaded on the car so that a place in question will be commanded on a map on which the car navigation is demonstrated.

The meritorious effects of the present invention are summarized as follows.

In the present invention, as described above, it is possible to provide a service not available at present, that is a service of instantaneously furnishing to e.g., a driver the service purveyors information, such as CM programs useful in case of an emergency for combating the emergency situation. Although an analogous service by manual intervention is furnished only to a few types of high-grade cars, it is necessary to provide a service center to arrange a large number of telephone operating personnel to offer such service, resulting in an elevated service cost. Conversely, there is no necessity in the present invention for providing a service center involving a large number of personnel to furnish an extremely inexpensive service of the analogous nature.

The first aspect of the invention is based on using a communication infrastructure, whilst the second aspect of the invention is based on using the broadcasting infrastructure. Thus, in practical application, the first and second aspects have their merits and demerits. If the communication infrastructure is used, portable telephone sets may be used, so that, in practicing the present invention, there is no necessity for making special new investments for the infrastructure, provided that the communication cost for the sortable telephone sets is borne by the user. On the other hand, if the broadcasting infrastructure is used, cooperation with broadcasting firms is required, even though the user is not charged for receiving the information. At any rate, the novel service can be furnished at a drastically reduced cost as compared to the manual service offered realized to date in only a few types of the high-grade automotive vehicles.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An information furnishing apparatus for coping with an emergency during driving an automotive vehicle, comprising:
   a common equipment provided on an operation center and an automotive vehicle side equipment provided on an automotive vehicle one to another, said automotive vehicle side equipment for performing bidirectional communication with said common equipment;
   (a) said common equipment comprising:
   (a1) service information storage unit storing a plurality of contents information comprehending at least the appellation of service purveyors, a plurality of type names indicating types of the services purveyed by said service purveyors, and a plurality of service purveyors information comprehending the business time and business places of the service purveyors, and
   (a2) an information retrieval unit retrieving, on reception from said automotive vehicle an information inquiry request at least specifying the type name indicating the type of the service useful in overcoming the emergency situation that has occurred in said automotive vehicle and the current position of said automotive vehicle, the optimum service purveyor information useful to overcome the emergency situation that has occurred, from said service information storage unit, taking into account the type name specified, current position and the current time, and for transmitting at least the contents information to the automotive vehicle as a requester;
   (b) said automotive vehicle side equipment comprising:
   (b1) a position detection unit detecting the current position of the automotive vehicle,
   (b2) an emergency situation decision unit determining, on occurrence of an emergency situation, the type name indicating the sort of the service useful in overcoming the emergency situation that has occurred, and
   (b3) an information acquisition unit transmitting an information inquiry request at least specifying the type name determined by said emergency situation decision unit and the current posit ion of the automotive vehicle as detected by said position detection means to said information retrieval unit, and outputting the information transmitted as a response from said information retrieval unit at an output device.

2. The information furnishing apparatus for coping with an emergency during driving an automotive vehicle as defined in claim 1,
   wherein said information retrieval unit sets a service purveyor information, as optimum one, among the plurality of service purveyors information stored in said service information storage unit, which has the same type name as the type name specified by said information inquiry, such that the service is accessible or available within the business time judging from the current time, and the place of business of which is closer to the current position of the automotive vehicle as a source of inquiry.

3. The information furnishing apparatus for coping with an emergency during driving an automotive vehicle as defined in claim 1,
   wherein said automotive vehicle side equipment comprises a time detection unit detecting the current time, and
   the current time as detected by said time detection unit is comprised in said information inquiry request by said information acquisition unit.

4. The information furnishing apparatus for coping with an emergency during driving an automotive vehicle as defined in claim 1,
   wherein said common equipment comprises a time detection unit detecting the current time, and
   said information retrieval unit acquires the current time of a time point of reception of the information inquiry request from said time detection unit.

5. The information furnishing apparatus for coping with an emergency during driving an automotive vehicle as defined in claim 1,
wherein said common equipment comprises a time detection unit detecting the current time, and
said automotive vehicle side device comprises:
an automotive vehicle control device generating a control signal for coping with an unusual occurrence in the automotive vehicle, and
a correlation table stating the correlation between the control signal generated by said automotive vehicle control device and the type name specifying the type of the service useful in overcoming the unusual occurrence,
said emergency situation decision unit, on occurrence of said control signal from said automotive vehicle control device, acquiring the type name corresponding to the generated control signal from said correlation table.

6. The information furnishing apparatus for coping with an emergency during driving an automotive vehicle as defined in claim 1,
wherein at least a portion of the service purveyors information stored in said service information storage unit is the CM information aired by data broadcast.

7. An information furnishing apparatus provided on an automotive vehicle carrying a data broadcast receiver, for coping with an emergency during driving said automotive vehicle, comprising:
(a) an extraction unit extracting, from the information received by said data broadcast receiver, the service purveyors information including at least contents information having at least names of the service purveyors, type names indicating the sort of the services furnished by said service purveyors, and information on the business time and places of business of said service purveyors;
(b) a service information storage unit storing a plurality of said service purveyors information;
(c) a position detection unit detecting the current position of an automotive vehicle;
(d) a time detection unit detecting the current time;
(e) an emergency situation; decision unit deciding on occurrence of an emergency situation the type name indicating the type of the service useful in overcoming the emergency situation that has occurred; and
(f) an information registration acquisition unit being fed with said service purveyor information extracted by said extraction means, the current position detected by said position detection unit, the current time detected by said time detection unit and the type name determined by said emergency situation decision unit, said information registration acquisition unit performing the processing of registering said service purveyor information in said service information storage unit and processing for retrieving from said service information storage unit an optimum service purveyor information helpful to overcome the emergency situation that has occurred to output at least the resultant contents information from an output device.

8. The information furnishing apparatus provided on an automotive vehicle carrying a data broadcast receiver, for coping with an emergency during driving said automotive vehicle, as defined in claim 7,
wherein said information registration acquisition unit comprises:
registering means for operating registration so that, if the service purveyor information having the same type name as that of the service purveyor information newly extracted by said extracting means is stored in said service information storage unit, a more desirable one service purveyor information among the service purveyors information having the same type name will be registered in said service information storage unit based on the current time as detected by said time detection unit and on the current automotive vehicle position as detected by said position detection unit; and
an information acquisition unit acquiring the service purveyors information having the same type name as that determined by said emergency situation decision unit from said service information storage unit.

9. The information furnishing apparatus provided on an automotive vehicle carrying a data broadcast receiver, for coping with an emergency during driving said automotive vehicle, as defined in claim 8,
wherein said registering means sets a service purveyor information such that the service is accessible or available a within the business time judging from the current time and the place of business of which is closer to the current position of the automotive vehicle as an optimum service purveyor information.

10. The information furnishing apparatus provided on an automotive vehicle carrying a data broadcast receiver, for coping with an emergency during driving said automotive vehicle, as defined in claim 7,
wherein said information registration acquisition unit comprises:
registering means for registering a service purveyor information newly extracted by said extraction means in said service information storage unit; and
an information acquisition unit for retrieving from said service information storage unit an optimum service purveyor information useful in overcoming the emergency situation that has occurred, based on the type name determined by said emergency situation decision means, the current time as detected by said time detection unit and the current automotive vehicle position as detected by said position detection unit.

11. The information furnishing apparatus provided on an automotive vehicle carrying a data broadcast receiver, for coping with an emergency during driving said automotive vehicle, as defined in claim 10,
wherein said information acquisition unit sets the service purveyor information which, among the service purveyors information stored in said service information storage unit, has the same type name as the type name determined by said emergency situation decision unit, such that the service is accessible or available within the business time judging from the current time and the place of business of which is closer to the current position of the automotive vehicle, as the optimum service purveyor information.

12. The information furnishing apparatus provided on an automotive vehicle carrying a data broadcast receiver, for coping with an emergency during driving said automotive vehicle, as defined in claim 7,
wherein said information registration acquisition unit comprises:
registering means for operating registration so that, if a number exceeding N of the service purveyors information having the same type name as that of the service purveyor information newly extracted by said extracting means is stored in said service information storage unit, only more optimum upper N service purveyors information will be registered in said service information storage unit, based on the current time as detected by said time detection unit and the current automotive vehicle position as detected by said position detection unit; and an information acquisition unit retrieving from said service information storage unit the optimum service purveyor information useful in overcoming the emergency situation that has occurred, based on the type name as determined by said emergency situation decision means, the current time as detected by said time detection unit and the current automotive vehicle position as detected by said position detection unit.

13. The information furnishing apparatus provided on an automotive vehicle carrying a data broadcast receiver, for coping with an emergency during driving said automotive vehicle, as defined in claim 12, wherein said information acquisition unit sets the service purveyor information which has the same type name as the type name as determined by said emergency situation decision unit, such that the service is accessible or available within the business time judging from the current time, and the place of business of which is closer to the current position of the automotive vehicle, as the optimum service purveyor information.

14. The information furnishing apparatus provided on an automotive vehicle carrying a data broadcast receiver, for coping with an emergency during driving said automotive vehicle, as defined in claim 7, comprising:

an automotive vehicle control device generating a control signal for coping with an unusual occurrence in the automotive vehicle, and a correlation table stating the correlation between the control signal generated by said automotive vehicle control device and the type name specifying the type of the service useful in overcoming the unusual occurrence, said emergency situation decision unit, on occurrence of said control signal from said automotive vehicle control device, acquiring the type name corresponding to the generated control signal from said correlation table.

15. The information furnishing apparatus provided on an automotive vehicle carrying a data broadcast receiver, for coping with an emergency during driving said automotive vehicle, as defined in claim 7, wherein at least a portion of the service purveyors information stored in said service information storage unit is aired by data broadcast.

16. An information furnishing apparatus for coping with an emergency during driving an automotive vehicle, comprising:

a common equipment provided on an operation center and an automotive vehicle side equipment provided on an automotive vehicle one to another, said automotive vehicle side equipment for performing bidirectional communication with said common equipment;

(a) said common equipment comprising:
(a1) a service information storage unit storing a plurality of contents information comprehending at least the appellation of service purveyors, a plurality of type names indicating types of the services purveyed by said service purveyors, and a plurality of service purveyors information comprehending the business time and business places of the service purveyors, and (a2) information retrieval means for retrieving, on reception from said automotive vehicle an information inquiry request at least specifying the type name indicating the type of the service useful in overcoming the emergency situation that has occurred in said automotive vehicle and the current position of said automotive vehicle, the optimum service purveyor information useful to overcome the emergency situation that has occurred, from said service information storage unit, taking into account the type name specified, current position and the current time, and for transmitting at least the contents information to the automotive vehicle as a requester;

(b) said automotive vehicle side equipment comprising:
(b1) position detection means for detecting the current position of the automotive vehicle, (b2) emergency situation decision means for determining, on occurrence of an emergency situation, the type name indicating the sort of the service useful in overcoming the emergency situation that has occurred, and (b3) information acquisition means for transmitting an information inquiry request at least specifying the type name determined by said emergency situation decision means and the current posit ion of the automotive vehicle as detected by said position detection means to said information retrieval means, and outputting the information transmitted as a response from said information retrieval means at an output device.

17. The information furnishing apparatus for coping with an emergency during driving an automotive vehicle as defined in claim 16, wherein said information retrieval means sets a service purveyor information, as optimum one, among the plurality of service purveyors information stored in said service information storage means, which has the same type name as the type name specified by said information inquiry, such that the service is accessible or available within the business time judging from the current time, and the place of business of which is closer to the current position of the automotive vehicle as a source of inquiry.

18. The information furnishing apparatus for coping with an emergency during driving an automotive vehicle as defined in claim 16, wherein said automotive vehicle side equipment comprises time detection means for detecting the current time, and the current time as detected by said time detection means is comprised in said information inquiry request by said information acquisition means.

19. The information furnishing apparatus for coping with an emergency during driving an automotive vehicle as defined in claim 16, wherein said common equipment comprises time detection means for detecting the current time, and said information retrieval unit acquires the current time of a time point of reception of the information inquiry request from said time detection means.

20. The information furnishing apparatus for coping with an emergency during driving an automotive vehicle as defined in claim 16, wherein said common equipment comprises time detection means for detecting the current time, and said automotive vehicle side device comprises:
an automotive vehicle control device generating a control signal for coping with an unusual occurrence in the automotive vehicle, and
a correlation table stating the correlation between the control signal generated by said automotive vehicle control device and the type name specifying the type of the service useful in overcoming the unusual occurrence,
said emergency situation decision means, on occurrence of said control signal from said automotive vehicle control device, acquiring the type name corresponding to the generated control signal from said correlation table.

21. The information furnishing apparatus for coping with an emergency during driving an automotive vehicle as defined in claim 16,
wherein at least a portion of the service purveyors information stored in said service information storage unit is the CM information aired by data broadcast.

22. An information furnishing apparatus provided on an automotive vehicle carrying a data broadcast receiver, for coping with an emergency during driving said automotive vehicle, comprising:
(a) extraction means for extracting, from the information received by said data broadcast receiver, the service purveyors information including at least contents information having at least names of the service purveyors, type names indicating the sort of the services furnished by said service purveyors, and information on the business time and places of business of said service purveyors;
(b) service information storage means for storing a plurality of said service purveyors information;
(c) position detection means for detecting the current position of an automotive vehicle;
(d) time detection means for detecting the current time;
(e) emergency situation decision means for deciding on occurrence of an emergency situation the type name indicating the type of the service useful in overcoming the emergency situation that has occurred; and
(f) information registration acquisition means for being fed with said service purveyor information extracted by said extraction means, the current position detected by said position detection means, the current time detected by said time detection means and the type name determined by said emergency situation decision means, said information registration acquisition means performing the processing of registering said service purveyor information in said service information storage means and processing for retrieving from said service information storage means an optimum service purveyor information helpful to overcome the emergency situation that has occurred to output at least the resultant contents information from an output device.

23. The information furnishing apparatus provided on an automotive vehicle carrying a data broadcast receiver, for coping with an emergency during driving said automotive vehicle, as defined in claim 22,
wherein said information registration acquisition means comprises:
registering means for operating registration so that, if the service purveyor information having the same type name as that of the service purveyor information newly extracted by said extracting means is stored in said service information storage means, a more desirable one service purveyor information among the service purveyors information having the same type name will be registered in said service information storage means based on the current time as detected by said time detection means and on the current automotive vehicle position as detected by said position detection means; and
an information acquisition means for acquiring the service purveyors information having the same type name as that determined by said emergency situation decision means from said service information storage means.

24. The information furnishing apparatus provided on an automotive vehicle carrying a data broadcast receiver, for coping with an emergency during driving said automotive vehicle, as defined in claim 23,
wherein said registering means sets a service purveyor information such that the service is accessible or available within the business time judging from the current time and the place of business of which is closer to the current position of the automotive vehicle as an optimum service purveyor information.

25. The information furnishing apparatus provided on an automotive vehicle carrying a data broadcast receiver, for coping with an emergency during driving said automotive vehicle, as defined in claim 22,
wherein said information registration acquisition means comprises:
registering means for registering a service purveyor information newly extracted by said extraction means in said service information storage means; and
information acquisition means for retrieving from said service information storage means an optimum service purveyor information useful in overcoming the emergency situation that has occurred, based on the type name determined by said emergency situation decision means, the current time as detected by said time detection means and the current automotive vehicle position as detected by said position detection means.

26. The information furnishing apparatus provided on an automotive vehicle carrying a data broadcast receiver, for coping with an emergency during driving said automotive vehicle, as defined in claim 25,
wherein said information acquisition means sets the service purveyor information which, among the service purveyors information stored in said service information storage means, has the same type name as the type name determined by said emergency situation decision means, such that the service is accessible or available within the business time judging from the current time and the place of business of which is closer to the current position of the automotive vehicle, as the optimum service purveyor information.

27. The information furnishing apparatus provided on an automotive vehicle carrying a data broadcast receiver, for coping with an emergency during driving said automotive vehicle, as defined in claim 22,
wherein said information registration acquisition means comprises:
registering means for operating registration so that, if a number exceeding N of the service purveyors information having the same type name as that of the service purveyor information newly extracted by said extracting means is stored in said service information storage means, only more optimum upper N service purveyors information will be registered in said service information storage means, based on the current time as detected by said time detection means and the current automotive vehicle position as detected by said position detection means; and information acquisition means for retrieving from said service information storage means the optimum service purveyor information useful in overcoming the emergency situation that has occurred, based on the type name as determined by said emergency situation decision means, the current time as detected by said time detection means and the current automotive vehicle position as detected by said position detection means.

28. The information furnishing apparatus provided on an automotive vehicle carrying a data broadcast receiver, for coping with an emergency during driving said automotive vehicle, as defined in claim 27, wherein said information acquisition means sets the service purveyor information which has the same type name as the type name as determined by said emergency situation decision means, such that the service is accessible or available within the business time judging from the current time, and the place of business of which is closer to the current position of the automotive vehicle, as the optimum service purveyor information.

29. The information furnishing apparatus provided on an automotive vehicle carrying a data broadcast receiver, for coping with an emergency during driving said automotive vehicle, as defined in claim 22, comprising:

an automotive vehicle control device generating a control signal for coping with an unusual occurrence in the automotive vehicle, and a correlation table stating the correlation between the control signal generated by said automotive vehicle control device and the type name specifying the type of the service useful in overcoming the unusual occurrence, said emergency situation decision means, on occurrence of said control signal from said automotive vehicle control device, acquiring the type name corresponding to the generated control signal from said correlation table.

30. The information furnishing apparatus provided on an automotive vehicle carrying a data broadcast receiver, for coping with an emergency during driving said automotive vehicle, as defined in claim 22, wherein at least a portion of the service purveyors information stored in said service information storage unit is aired by data broadcast.

* * * * *